United States Patent [19]
Lubarsky

[11] 3,742,199
[45] June 26, 1973

[54] BINARY CODE COMMUNICATION SYSTEM

[75] Inventor: Daniel P. Lubarsky, San Mateo, Calif.

[73] Assignee: Larse Corporation, Palo Alto, Calif.

[22] Filed: Sept. 21, 1970

[21] Appl. No.: 73,935

[52] U.S. Cl. ............ 235/154, 340/174.1 A, 178/68, 178/69.5 R
[51] Int. Cl. ........................................ G06f 3/04
[58] Field of Search .............................. 235/154; 340/174.1 A, 347 DD; 178/68, 66, 67, 69.5 R, 68

[56] References Cited

UNITED STATES PATENTS

| | | | |
|---|---|---|---|
| 3,423,744 | 1/1969 | Gerlach et al. | 340/174.1 A |
| 2,912,684 | 11/1959 | Steele | 235/154 X |

*Primary Examiner*—Charles D. Miller
*Attorney*—Townsend and Townsend

[57] ABSTRACT

A binary code communication system in which the binary bits are formatted for transmission into a sequence of code elements, each code element comprising four bits beginning with a timing bit having a first binary value followed by two consecutive data bits in turn followed by a second timing bit having a second binary value. One or more encoders receive binary data bits from a plurality of parallel inputs, serially convert the binary data bits into a data string, generate appropriate timing bits, and logically gate the data bits and timing bits into code elements. The code elements are grouped into words for transmission. One or more decoders receive, analyze and decode the transmitted encoded data sampling the bit values and bit transitions within each code element to determine the occurrence of errors. Error-free decoded data is passed to output while erroneous data is flagged. A system for transmission of encoded data from a plurality of remote stations on a single channel is described.

2 Claims, 32 Drawing Figures

INVENTOR
DANIEL P. LUBARSKY
BY
Townsend and Townsend
ATTORNEYS

INVENTOR.
DANIEL P. LUBARSKY
BY
Townsend and Townsend
ATTORNEYS

INVENTOR.
DANIEL P. LUBARSKY
BY
Townsend and Townsend
ATTORNEYS

INVENTOR
DANIEL P. LUBARSKY
BY
Townsend and Townsend
ATTORNEYS

INVENTOR.
DANIEL P. LUBARSKY
BY
Townsend and Townsend
ATTORNEYS

INVENTOR.
DANIEL P. LUBARSKY
BY
Townsend and Townsend
ATTORNEYS

INVENTOR.
DANIEL P. LUBARSKY
BY
Townsend and Townsend
ATTORNEYS

INVENTOR.
DANIEL P. LUBARSKY
BY
Townsend and Townsend
ATTORNEYS

INVENTOR.
DANIEL P. LUBARSKY
Townsend and Townsend
ATTORNEYS

INVENTOR
DANIEL P. LUBARSKY
BY
Townsend and Townsend
ATTORNEYS

INVENTOR.
DANIEL P. LUBARSKY
BY
Townsend and Townsend
ATTORNEYS

INVENTOR.
DANIEL P. LUBARSKY
BY
Townsend and Townsend
ATTORNEYS

INVENTOR.
DANIEL P. LUBARSKY
BY
Townsend and Townsend
ATTORNEYS

INVENTOR.
DANIEL P. LUBARSKY
BY
Townsend and Townsend
ATTORNEYS

INVENTOR.
DANIEL P. LUBARSKY
BY
Townsend and Townsend
ATTORNEYS

INVENTOR.
DANIEL P. LUBARSKY
BY
Townsend and Townsend
ATTORNEYS

INVENTOR.
DANIEL P. LUBARSKY
BY
Townsend and Townsend
ATTORNEYS

INVENTOR
DANIEL P. LUBARSKY
BY
Townsend and Townsend
ATTORNEYS

BINARY CODE COMMUNICATION SYSTEM

This invention relates to a new and improved binary data communication system, and in particular to a new binary code, encoder and decoder for the transmission, storage, and processing of binary data.

A variety of binary digital data codes have been developed such as the "non return to zero" (NRZ), "return to zero" (RZ) and bi-phase codes. In such codes, binary values are represented by, for example, two voltage levels or two frequency levels, or the binary values are represented by transitions between two levels based on, for example, the number of transitions or the direction of transition. Problems frequently encountered in the use of existing codes include the necessity for phase locking the code, susceptibility to noise interference, and inefficiency due to the number of timing bits required per data bit and in the number of levels required to represent the binary data.

It is an object of the present invention to provide a new extremely reliable binary digital data code affording multiple reference points within the code for error detection.

Another object of the invention is to provide an efficient binary code requiring only one timing or synch bit for every data bit and which affords not only the advantages of synchronous codes in its provision of timing bits but also of asynchronous codes in its capability of withstanding noise interference and phase "jitter" in the transition between bits while maintaining the integrity of the encoded data.

A further object of the invention is to provide a symmetrical binary data digital code which can be read in either direction, useful for magnetic recording and storage applications.

In order to accomplish these results, the present invention contemplates a novel binary data code according to which binary timing pulses and binary data pulses are formatted into a sequence of code elements, each code element comprising four bits beginning with a timing bit having a first binary value followed by two consecutive data bits in turn followed by a second timing bit having a second binary value. The encoded data is in a two valued NRZ form. Code elements are in turn formatted into words of a predetermined number of elements terminating in at least one additional bit indicating the end of a word. A feature of the code format is that it permits both synchronous multiple word transmission and asynchronous single word transmission.

The invention thus generally contemplates a method of encoding data by generating a first timing bit having one binary value, generating two consecutive data bits following the first timing bit, and generating a second timing bit following the two consecutive data bits, the second timing bit having a binary value opposite the first timing bit. These steps are reiterated to provide a string of a predetermined number of code elements, each code element comprising four bits.

In one example, an encoder is provided for receiving binary bits from a plurality of parallel inputs and for serially converting the binary bits to a data string. The encoder also generates a first two-level waveform comprising a train of timing pulses of alternating binary value, each alternating value having a duration equal to the desired code bit duration; and generates a second two-level waveform comprising a train of timing pulses of alternating binary values having a period equal to one desired code element comprising four code bits. The encoder is provided with logic circuitry for gating the first and second trains of timing pulses and the data bit strings to form a sequence of code elements, each code element comprising the four bits beginning with a timing bit having a first binary value followed by two consecutive data bits in turn followed by a second timing bit having a second binary value. The sequence of code elements forms a two-level waveform, a zero voltage level, for example, representing a binary zero and a nominal ten volt level, for example, representing a binary one. The code is also available in a frequency shift key mode where two different frequency signals represent the two binary value and in a frequency key mode where a frequency signal represents one value and a d.c. voltage level the other. The code elements are in turn formatted into words of a predetermined number of code elements, each word terminating in at least one additional bit indicating the end of a word.

The invention also contemplates one or more decoders for receiving, analyzing, and decoding the binary bits encoded as heretofore described. A feature and advantage of the novel code contemplated by the present invention is that it affords multiple reference points for error detection within each code element. Thus, a transition from second to first binary value between the first timing bit and first data bit and between the second data bit and the second timing bits of a code element is forbidden. Furthermore, there can be no more than one occurrence of a transition from second to first binary value between the first and second data bits of a code element. The first bit of a code element, being the first timing bit, must always have a first binary value while the fourth bit of a code element, being the second timing bit, must always have a second binary value. No more than a specified number of bits is permitted in a code element, normally four, but five or more for the last code element of a word.

Accordingly, the invention contemplates a method of decoding the received data involving a thorough analysis of the code elements. Thus, the decoder includes logic circuitry for validating the absence of a transition from second to first binary value between the first timing bit and the first data bit and between the second data bit and the second timing bit of a code element. Logic circuitry is also provided for validating the occurrence of no more than one transition from second to first binary values between the first and second data bits of a code element. The first and fourth bits of a code element are sampled for validating the occurrence of first and second binary values, respectively, for the first and second timing bits occurring at the beginning and at the end of each code element. The bits in a code element are counted as are the number of code elements in a word. Finally, the first and second data bits, being the intermediate bits in each code element are sampled to determine the value of the data bits in each code element. The values are temporarily stored and the circuitry arranged to handle the occurrence of an error as indicated by the validating logic circuitry.

Logic circuitry can additionally be provided for gating a code element with specified P signals to determine the direction of transition in between data bits of a code element and for validating the occurrence of no more than one transition from second to first binary values between the data bits of a code element. Furthermore, a number of bits in a code element are counted and the occurrence of an impermissible number of bits indicated by the circuitry.

In one example, the decoder includes a local oscillator phase locked with received binary encoded data for generating various timing pulse trains. The trains of timing pulses comprise two-level binary waveforms having alternating binary values represented by the alternating levels. A first series of timing pulses L is synchronized with and coincident with the received binary data bits of a code element. A second series of timing pulses P also synchronized with the received binary data bits of a code element is phase shifted so that the timing pulses are coincident with the transitions between bits of a code element. Logic circuitry gates a code element with specified P signals to determine the direction of specified transitions between bits and for validating the absence of a transition from second to first binary values between the first timing bit and the first data bits and the second data bit and the second timing bit of a code element. Logic circuitry also provides for gating a code element with specified L signals and with narrow pulse strobe signals to determine the values of specified bits and for validating that the first timing bit has a first binary value and that the second timing bit has a second binary value. The values of the two data bits of a code element are sampled by gating the code element with other specified L signals and strobe timing signals and the values of the data bits are temporarily stored. Indication is provided in the event that word analysis indicates the occurrence of an error in a code element and means are provided for transferring the temporarily stored decoded data bits to an output storage after a predetermined number of code elements have been received and analyzed to be error free.

A feature and advantage of this binary code, encoder, and decoder system is that a variety of different error detecting features can be incorporated in the decoder word analysis. Moreover, other error detecting features can be incorporated such as, for example, parity bits in the encoded data for comparison with parity check bits generated at the decoder. Another technique is the "double scan" technique for sampling the data bits of a code element a second time and temporarily storing them a second time in the same temporary storage element. A change of condition in one of the bit elements of the temporary storage indicates the occurrence of an error.

The invention further contemplates a system for transmitting the encoded data along a common channel from a plurality of stations, each having an encoder and transmitter. Transmission control means are provided at each station for enabling and disabling the respective data transmitting means. Data sensing units at each station sense the presence of data at the output of the encoder for transmission and generates a signal to activate the transmission control means. A timing signal generating means at each station generates in each predetermined period of time a different time window signal for each station for enabling the respective transmitting control means and transmitter at different times when data is sensed thereby to avoid interference by the different stations during transmission on a common channel.

According to the invention, the timing signal generator at each station generates a unique time window signal once each predetermined period of time noncoincident with the unique time window for any other station. The unique time window signal includes a transmit time interval intermediate two wait time intervals, all three time intervals being of substantially equal length. The timing signal generator at each station is also adapted to generate a non-unique time window signal coincident with the unique time window signal of other stations. The non-unique time window, however, includes a shifted transmit time interval before or after two wait intervals, the three intervals also being of substantially equal length. By this expedient, the transmit time intervals of a coincident unique time window and non-unique time window of two different stations are non-coincident.

Other objects, features and advantages of the present invention will become apparent in the following specification and accompanying drawings.

In the drawings:

FIG. 2a is a schematic diagram of the input scanner and parallel to serial converter of the encoder while

FIGS. 3a, 3b, 3c, and 3d are schematic diagrams of the countdown generator or frequency divider chain, frequency selector, bit rate selector, and time window generator, respectively, for use in the encoder.

Figure 2A:
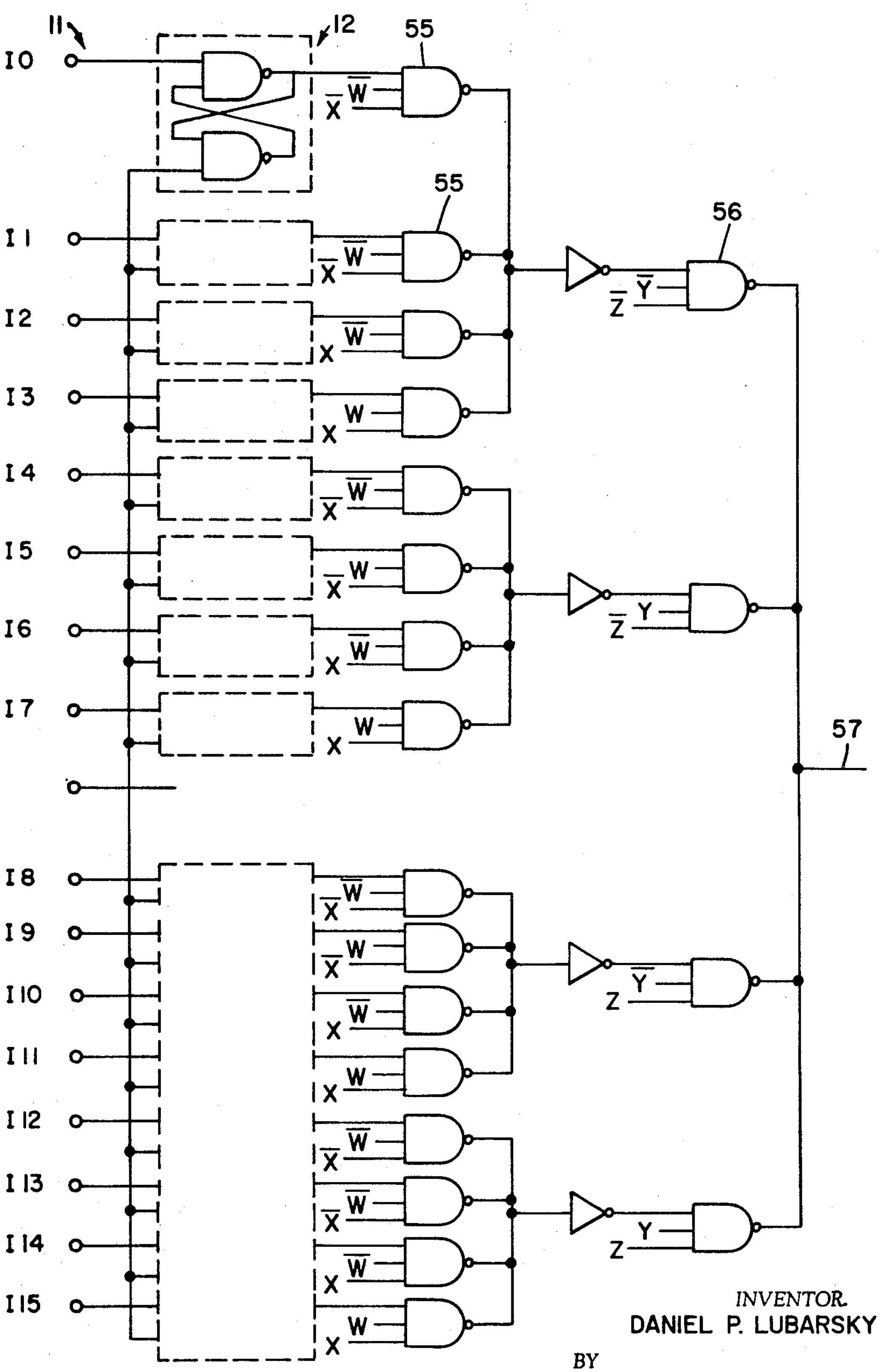
Figures 2B, 4:
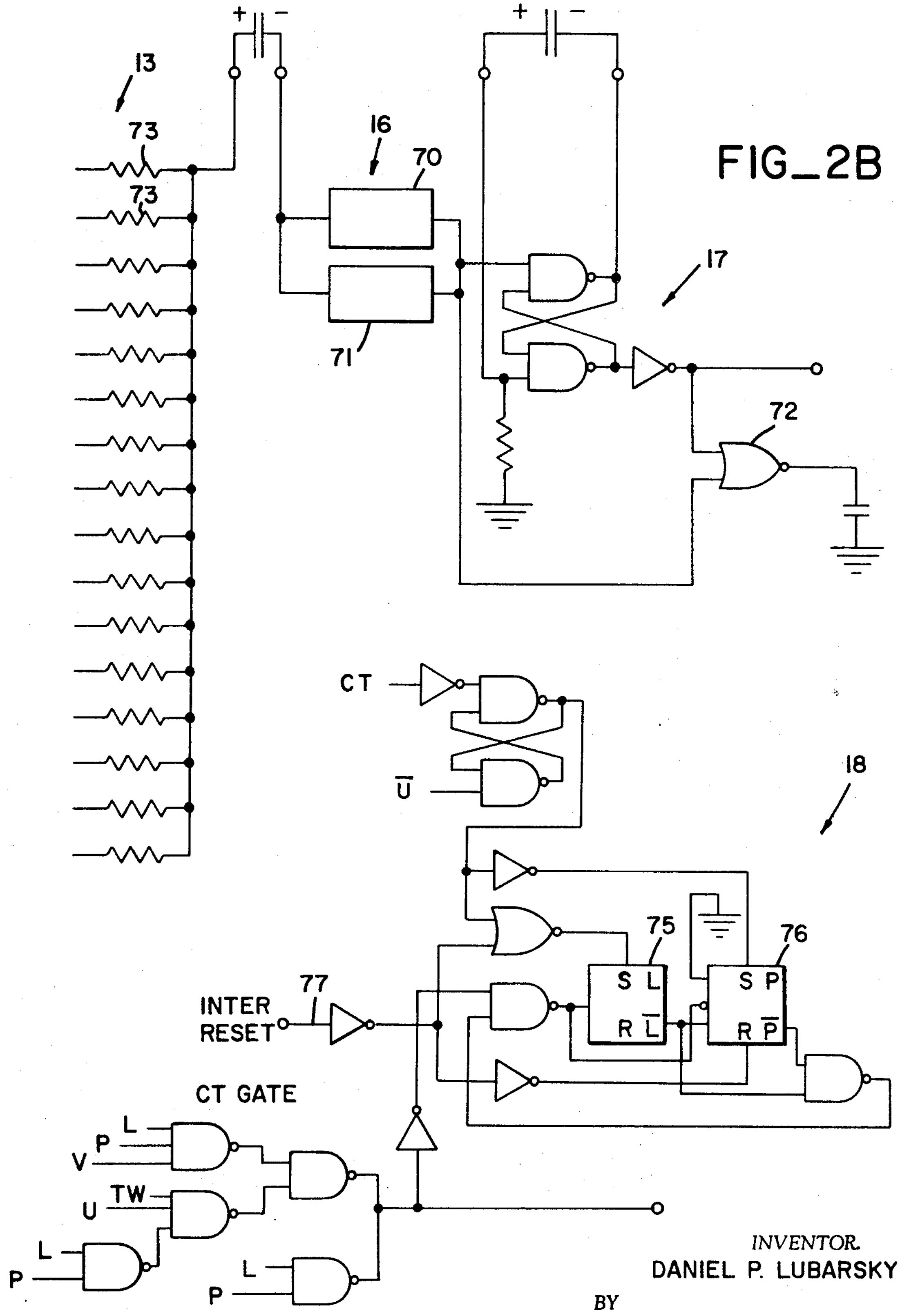
FIG. 2b is a schematic diagram of the data sensing unit or state change sensor and noise filter to prohibit noise from turning on the transmitter.

FIG. 4 is a schematic diagram of the transmission control unit.

Figure 5A:
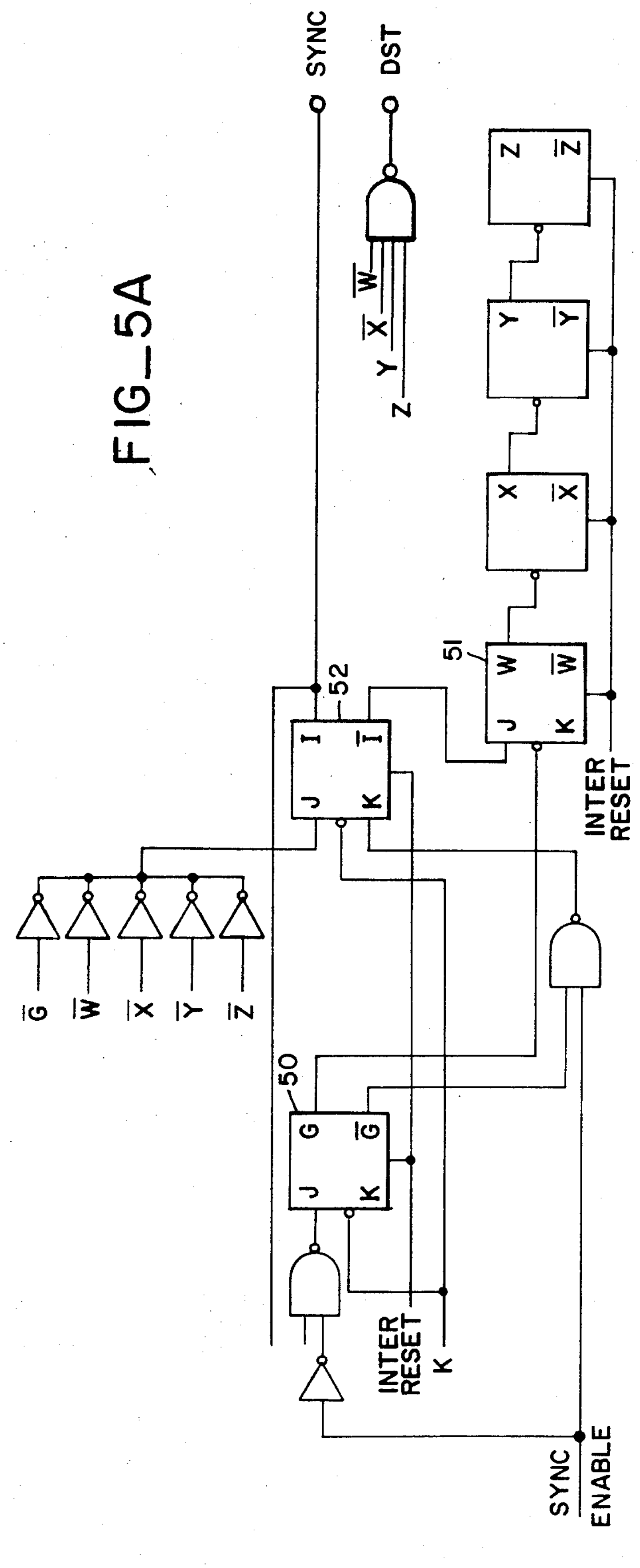

FIG. 5a is a block diagram of a counter and time signal generator for generating signals used in the encoder, while 5b is a schematic diagram of the logic circuitry for interleaving timing bits and data bits into code elements.

Figure 6:
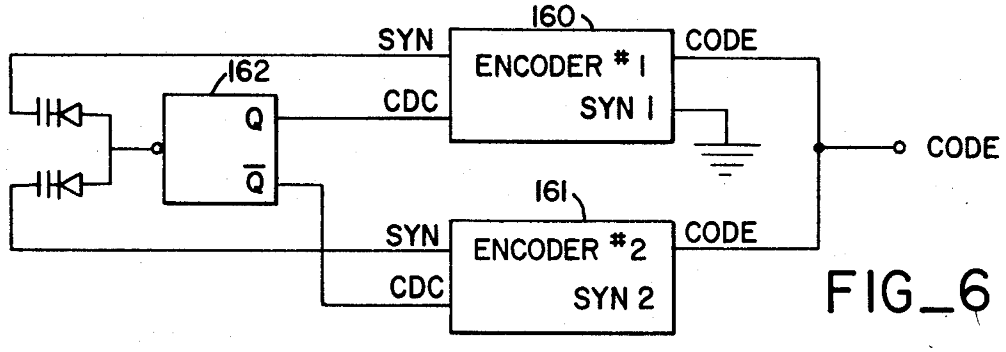
Figure 6A:
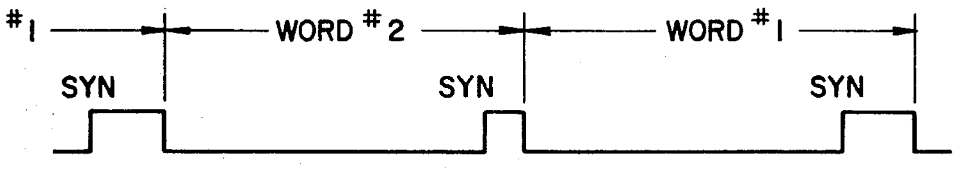

FIG. 6 is a block diagram of two stacked encoders while FIG. 6a is a graph showing the synch pulses at the end of the first and second words, respectively, encoded by the first and second encoders.

Figure 7:
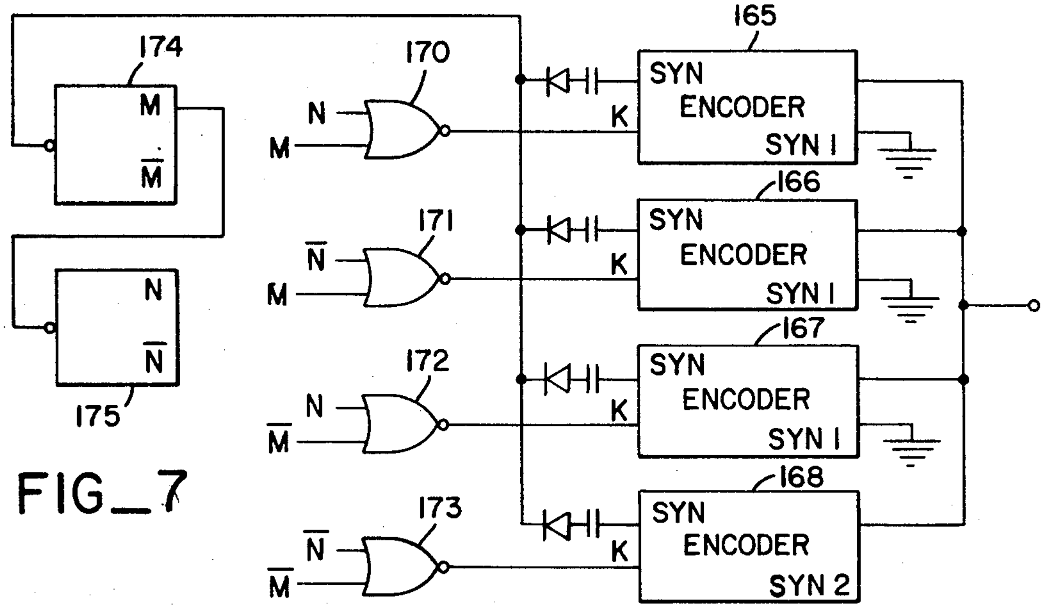
Figure 7A:
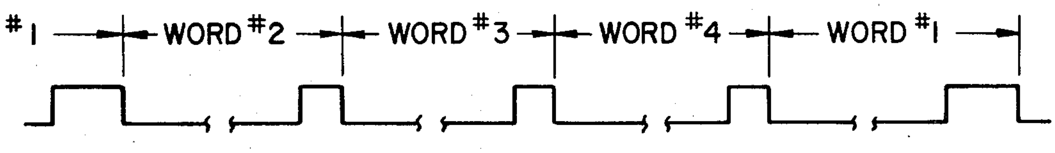

FIG. 7 is a block diagram of four stacked encoders while FIG. 7a is a graph showing the synch pulses following the four words generated by the four respective encoders.

Figure 8:
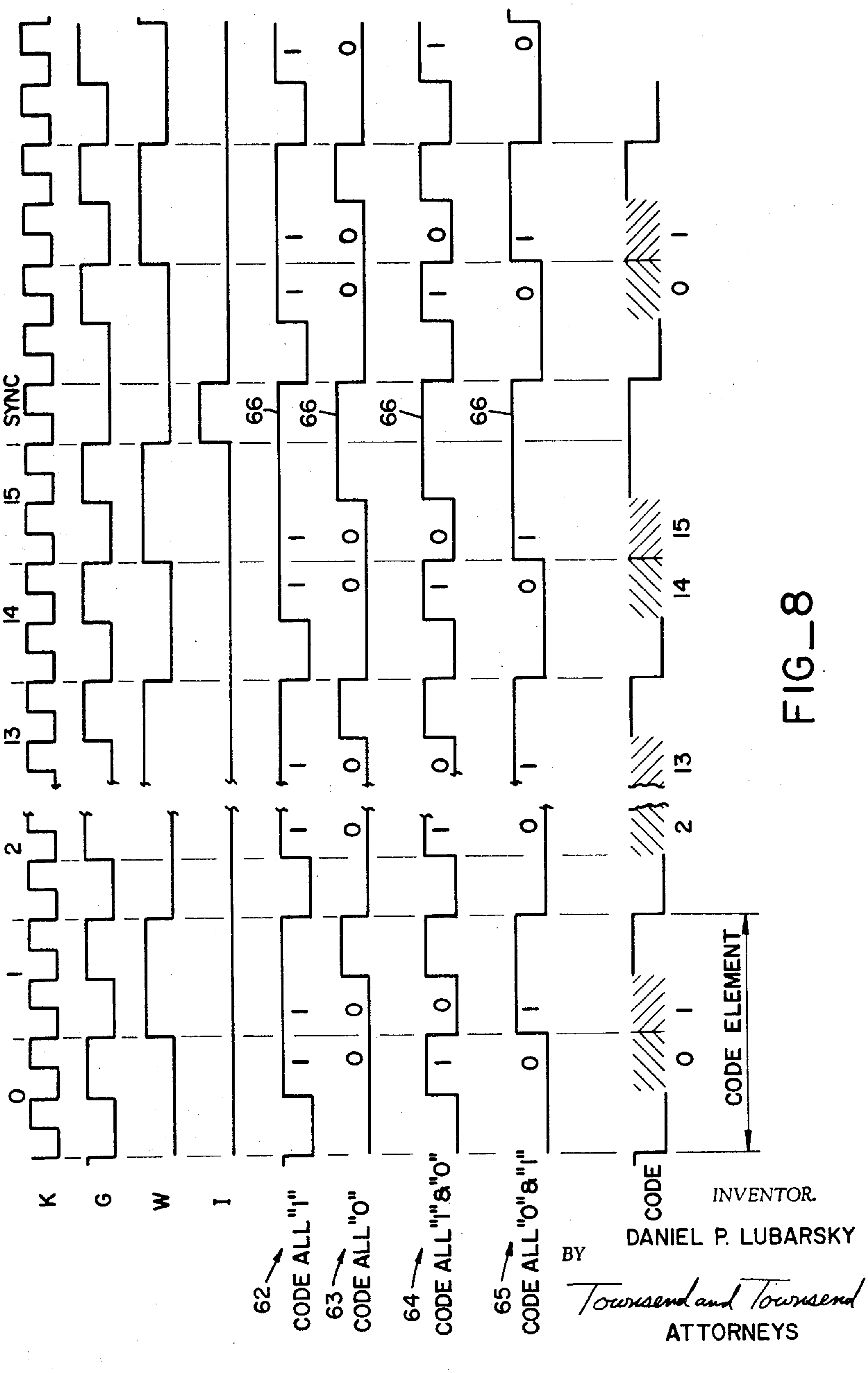

FIG. 8 is a timing chart showing the frequency and phase relationship of various two-level binary waveforms generated in the encoder.

Figure 9:
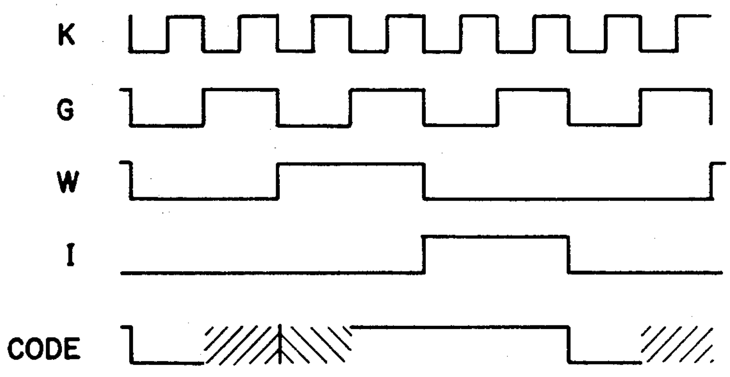

FIG. 9 is another timing chart showing two-level waveforms generated in the encoder.

Figure 10:
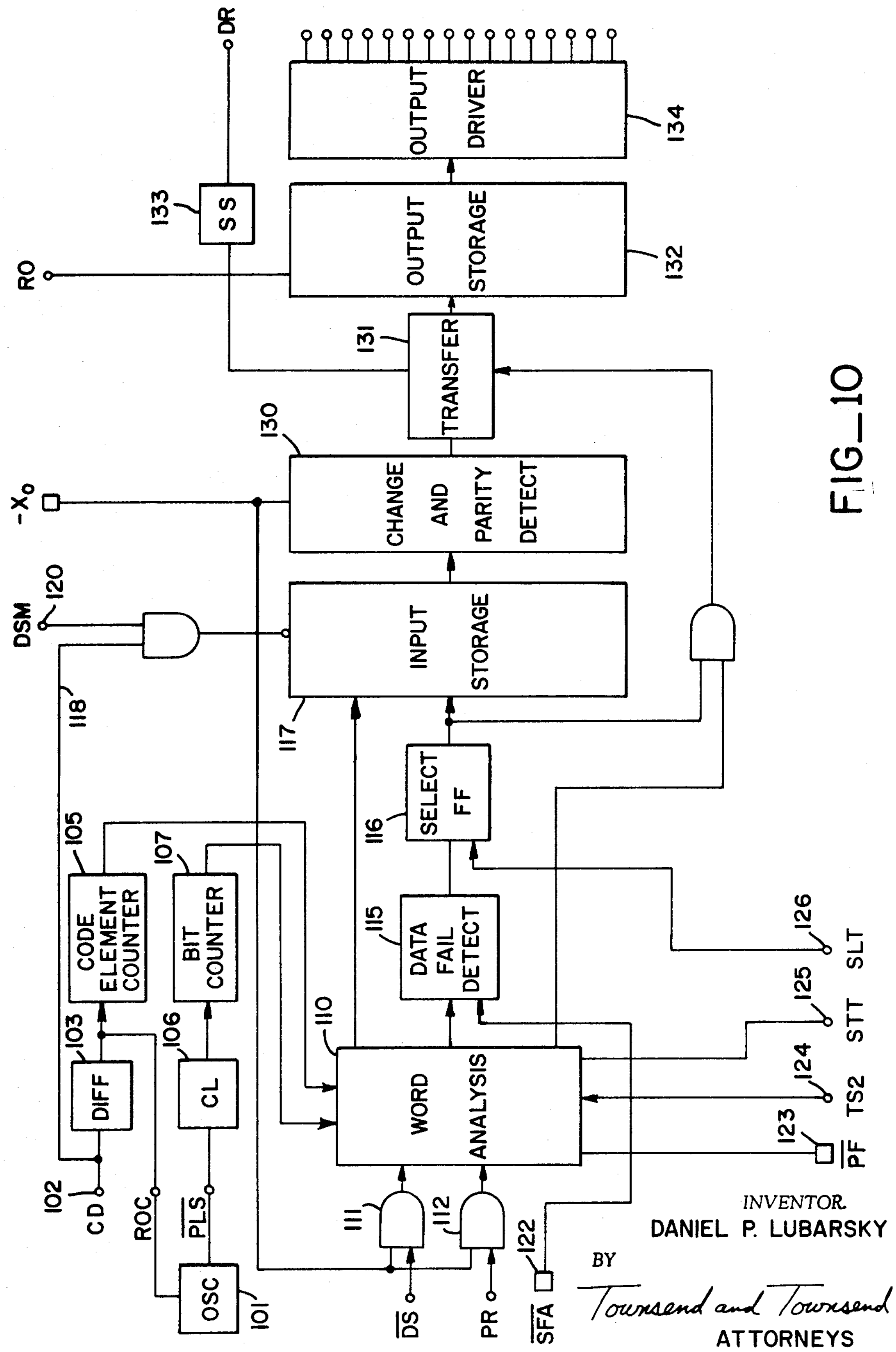

FIG. 10 is a block diagram of a decoder according to the present invention.

Figures 11, 11A, 11B, 11C:
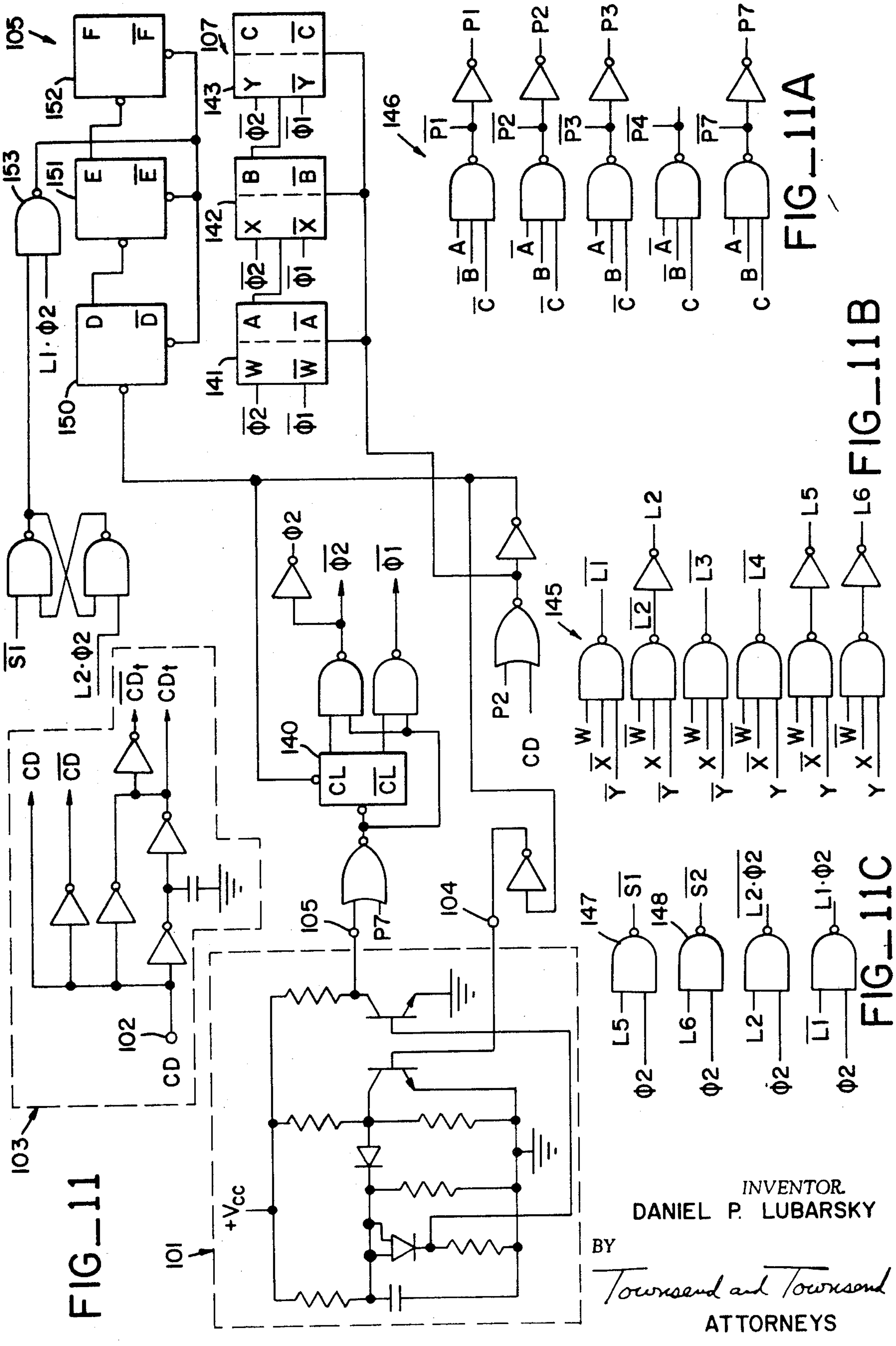

FIG. 11 is a schematic diagram of a portion of the decoder showing the phase locked oscillator, differentiator, code element counter, and bit counter, while FIGS. 11a, 11b and 11c are subordinate logic circuits used in generating various timing pulses utilized in the decoder.

Figure 12:
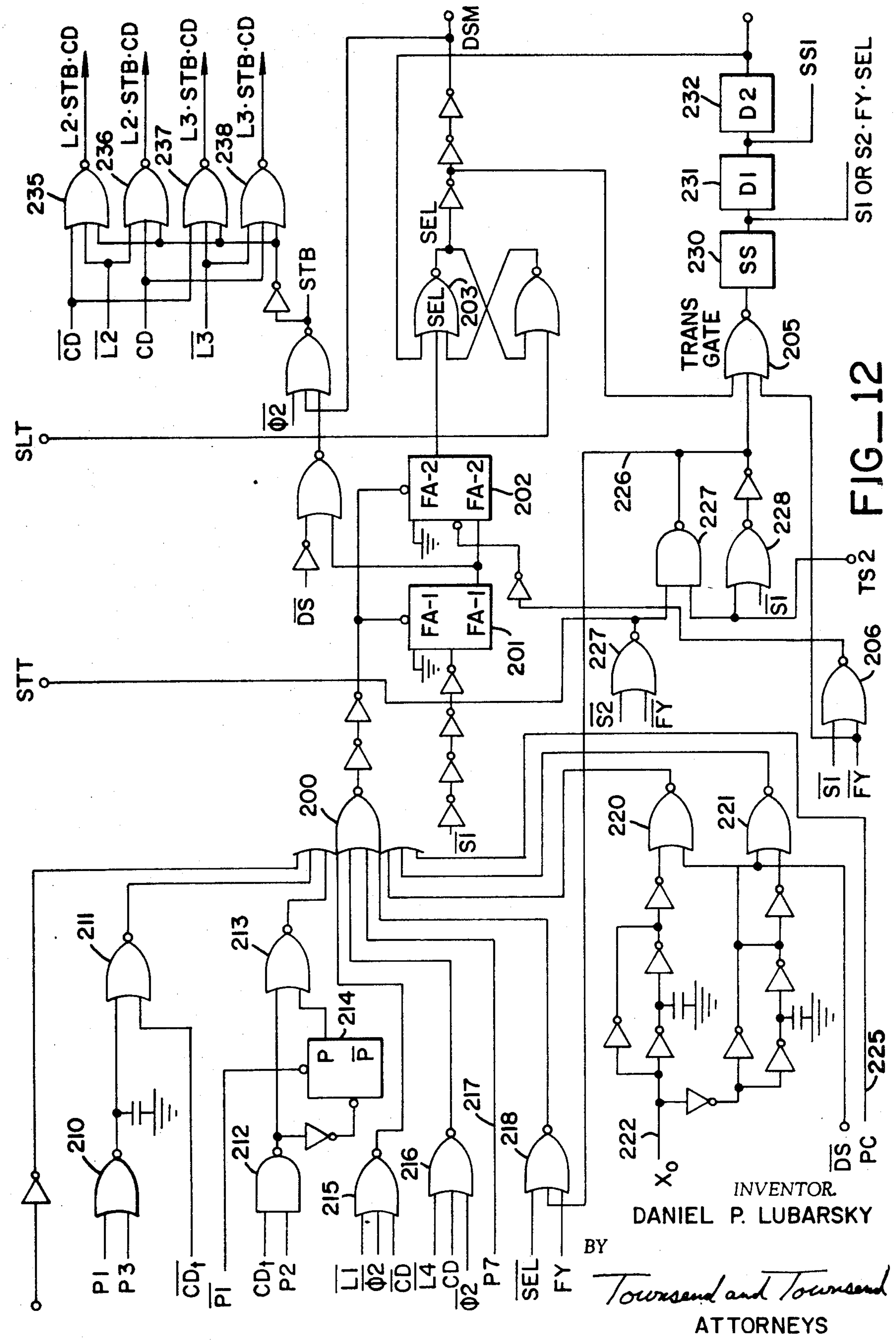

FIG. 12 is a schematic diagram of the word analysis unit in the decoder.

Figures 2C, 3D, 13:
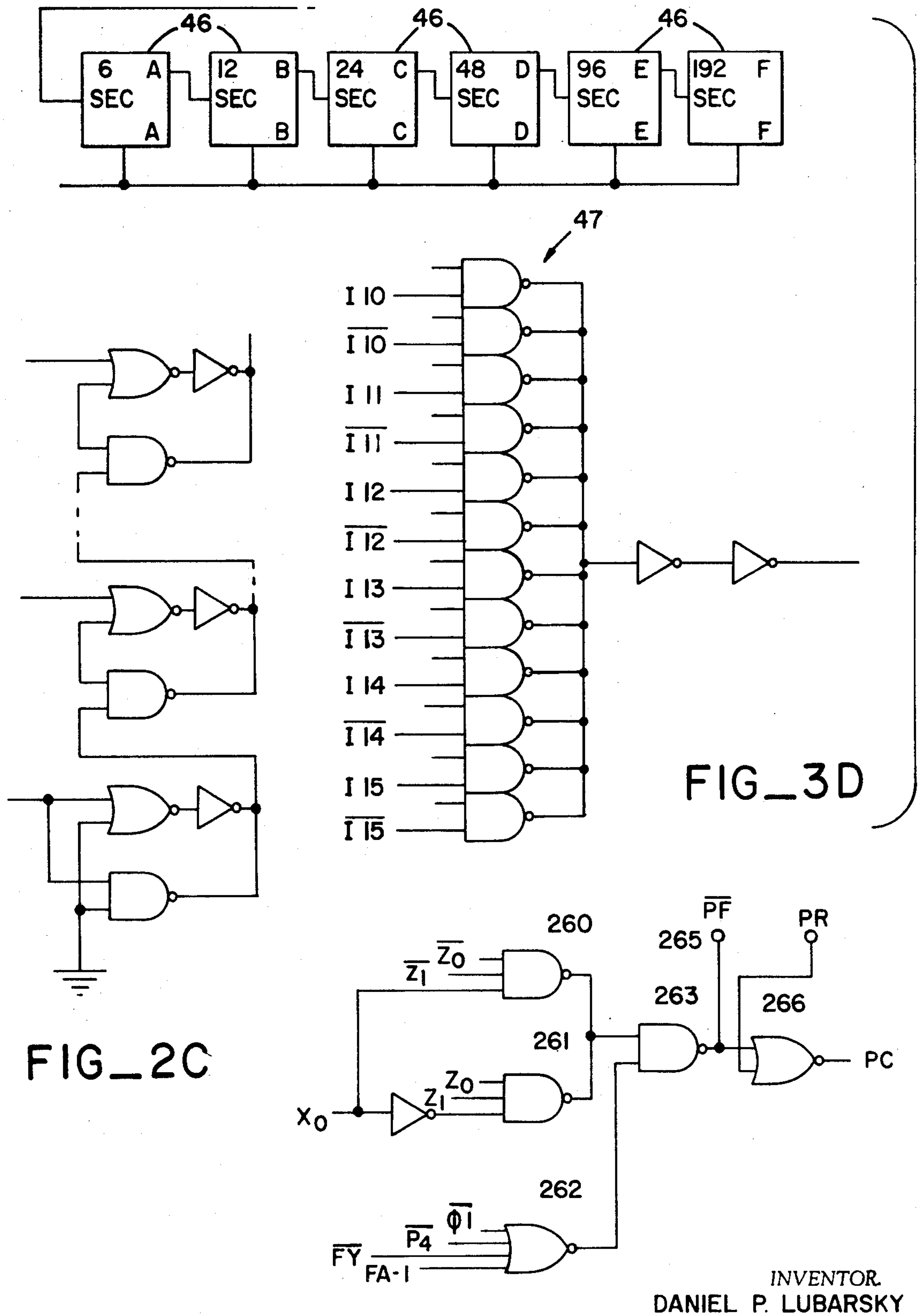
FIG. 2c is an alternate form of state change sensor which also functions as a parity bit generator.

FIG. 13 is a schematic diagram of the parity generator for the decoder.

Figure 14:
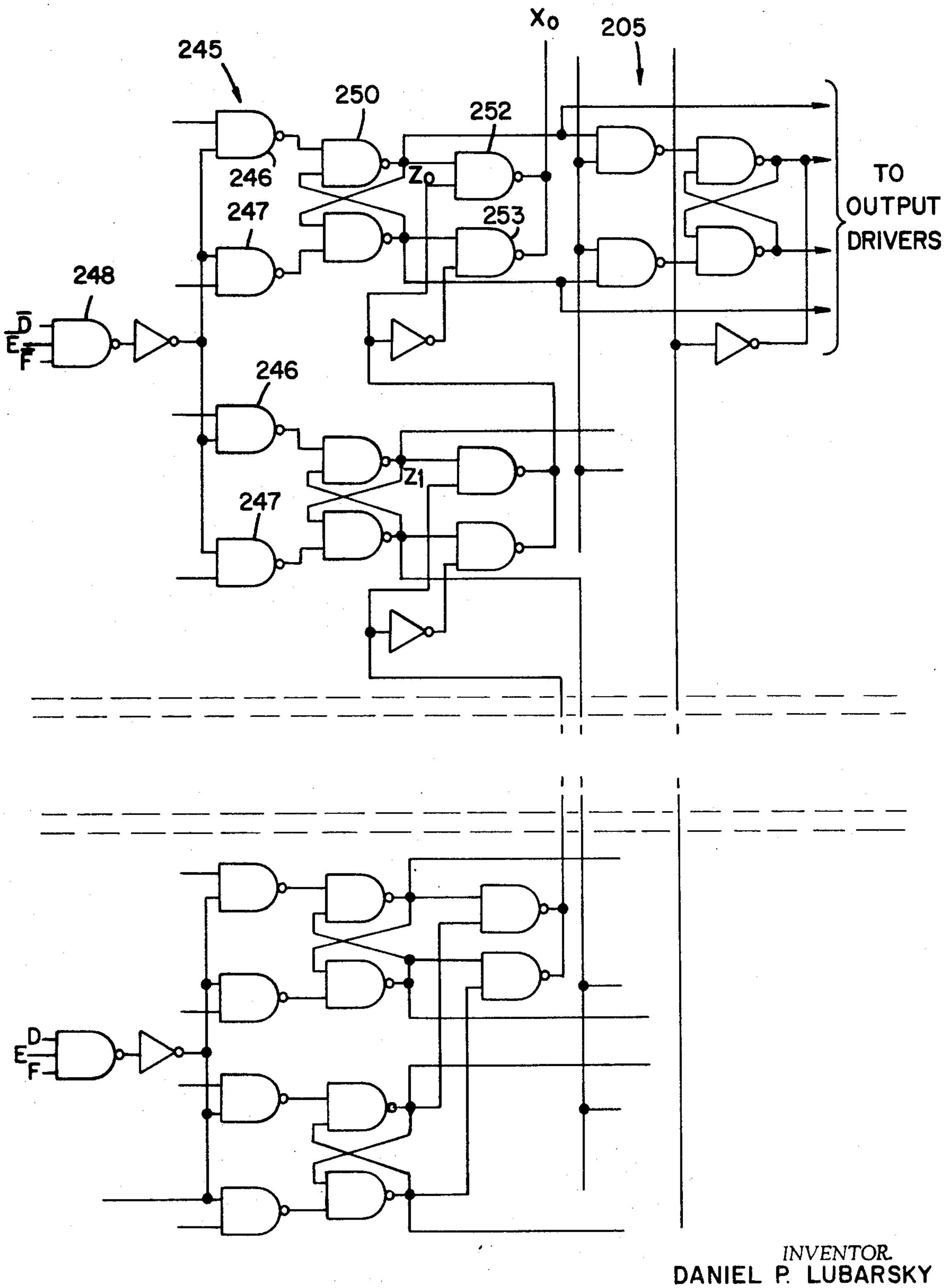

FIG. 14 is a schematic diagram of another portion of the decoder showing the data bit sampling gates, input storage, parity generator, transfer gates and output storage.

Figure 15:
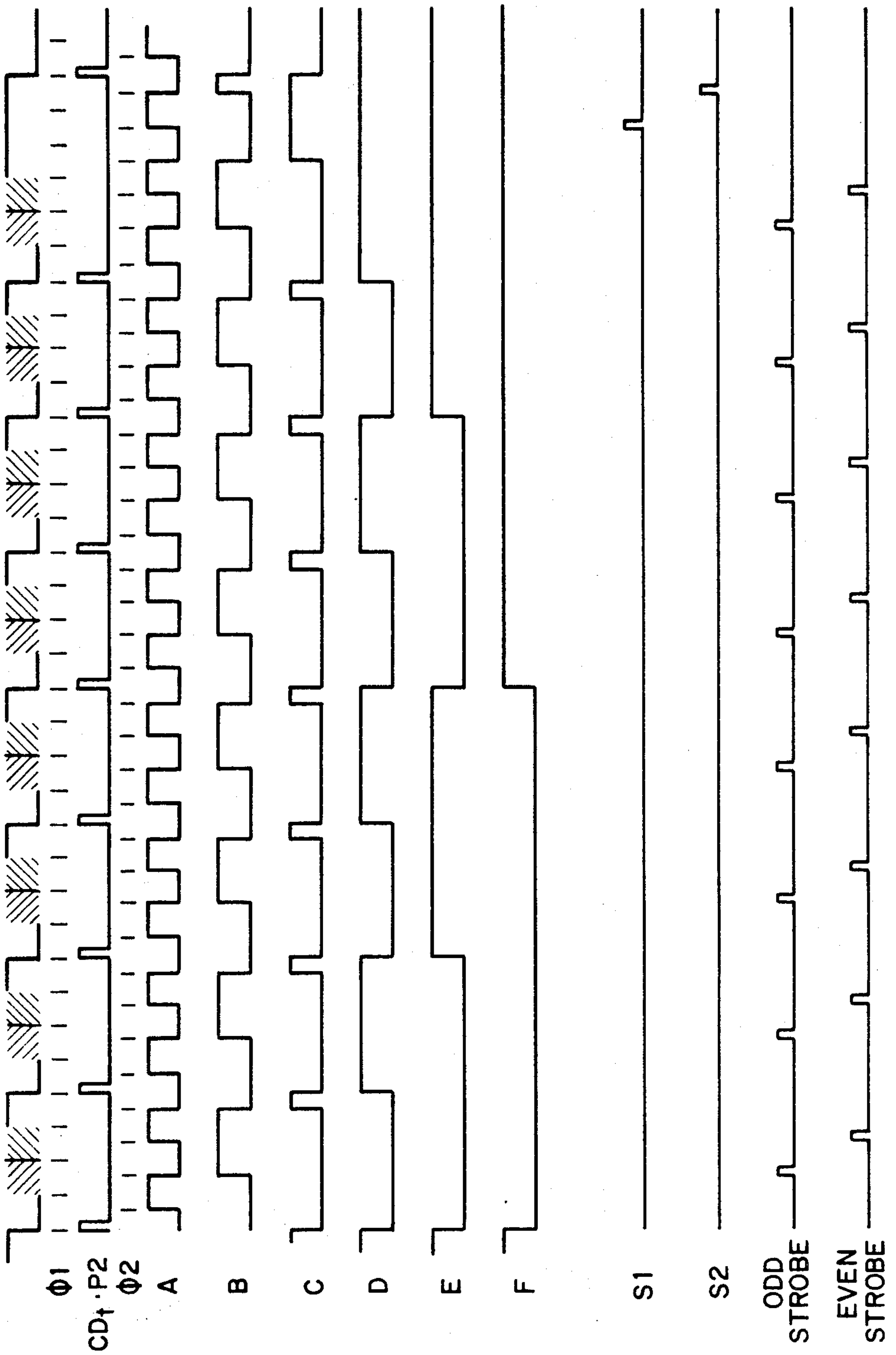

FIG. 15 is a timing chart showing the relationship of frequency and phase between various two level binary waveforms generated in the decoder.

Figure 16:
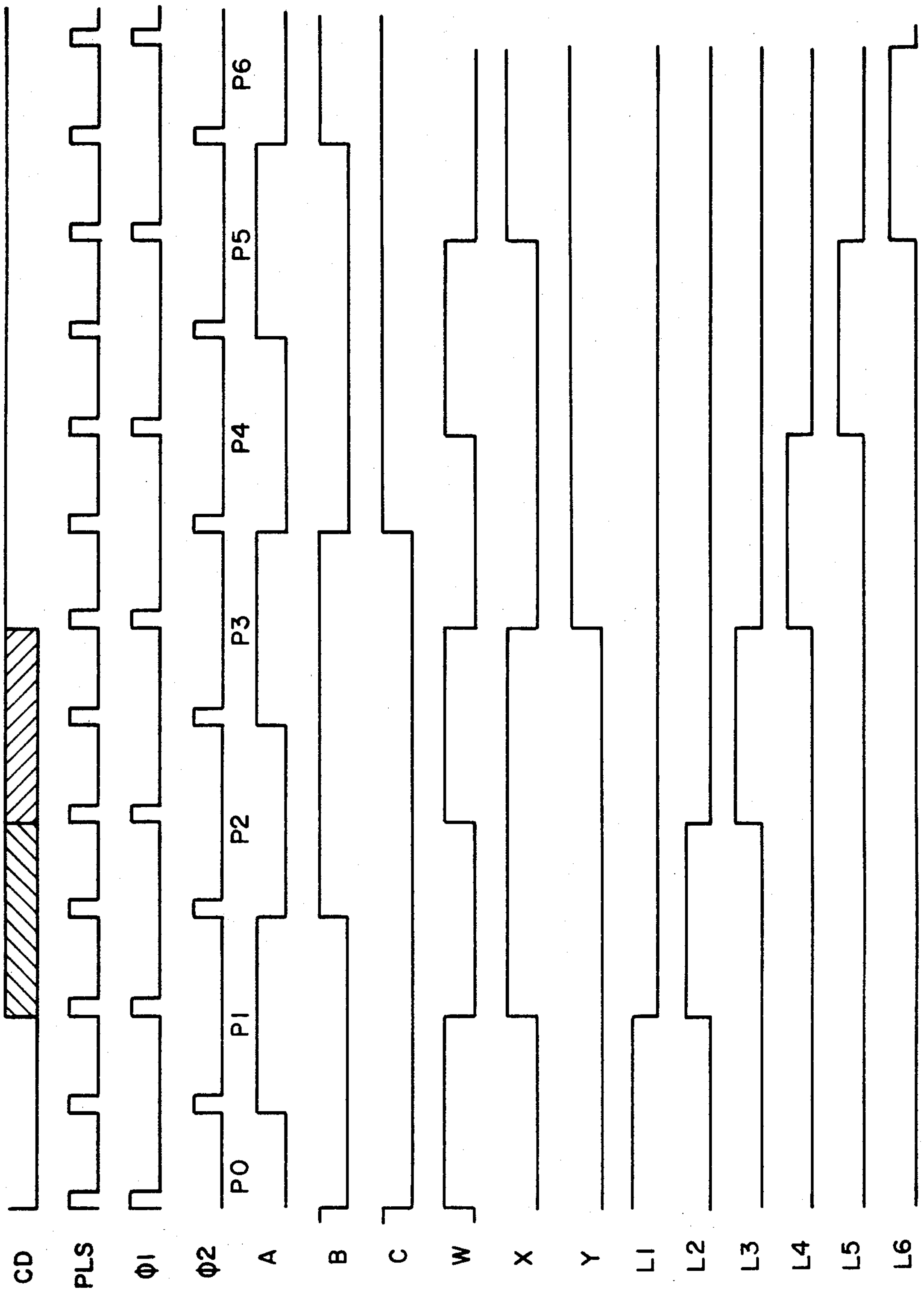

FIG. 16 is another timing chart showing the relationship between additional signals generated in the decoder.

Figure 17:
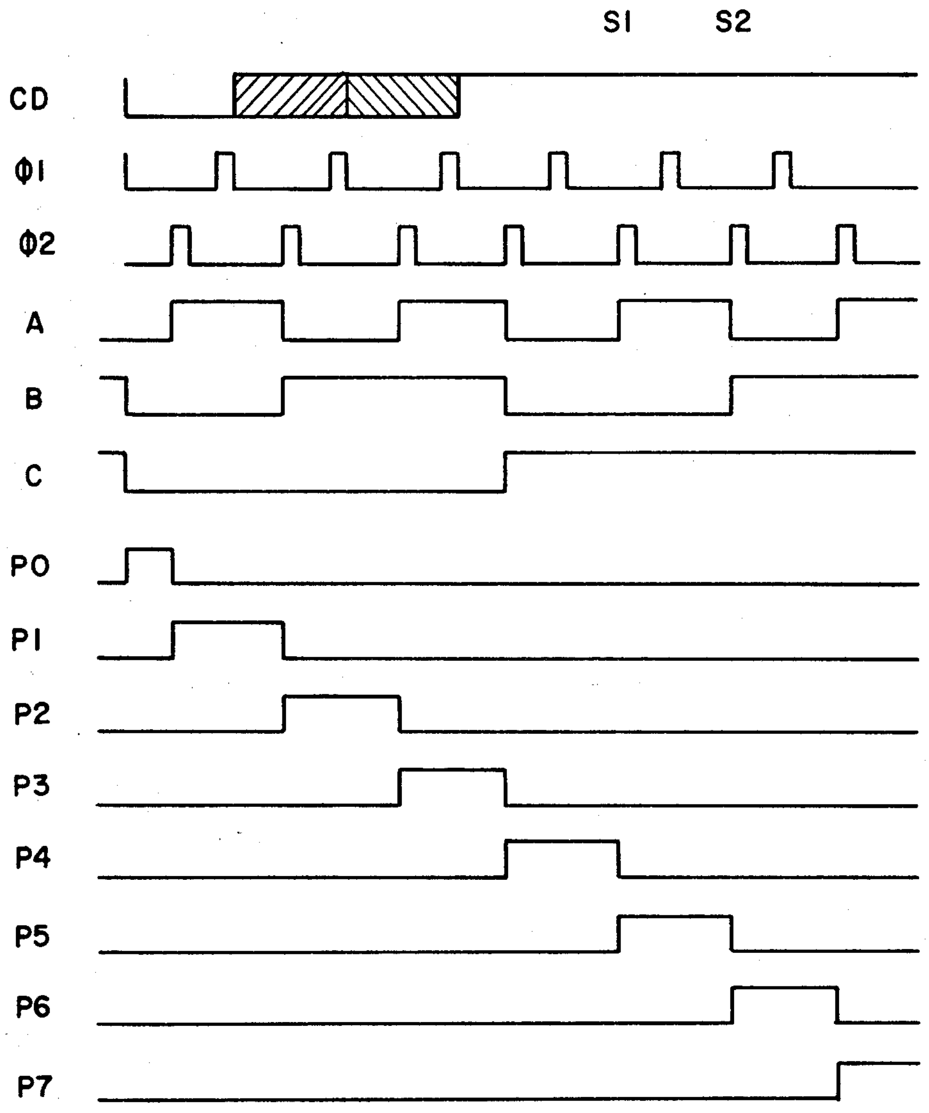

FIG. 17 is yet another timing chart showing additional relationships between two level waveforms generated in the decoder.

Figure 18A:
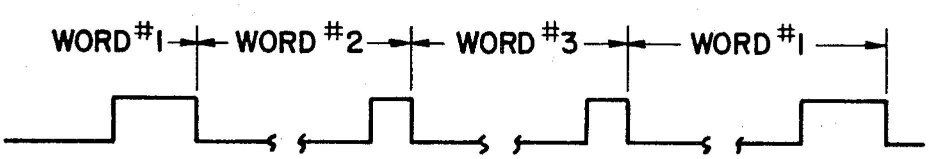
Figure 18:
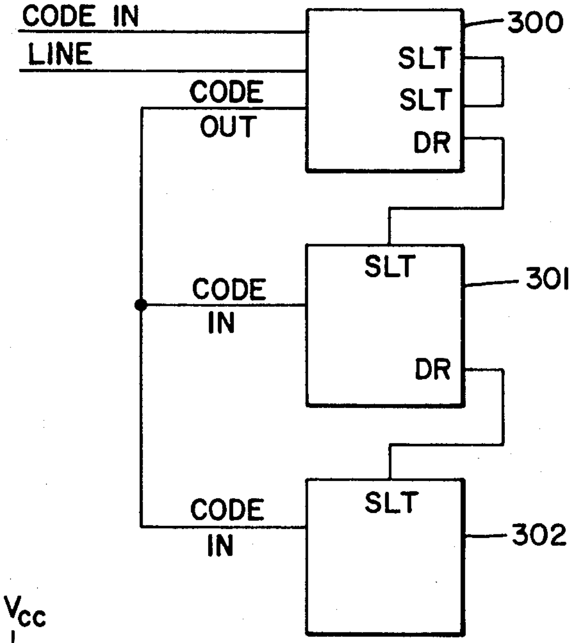

FIG. 18 is a schematic diagram of stacked decoders.

Figure 19:
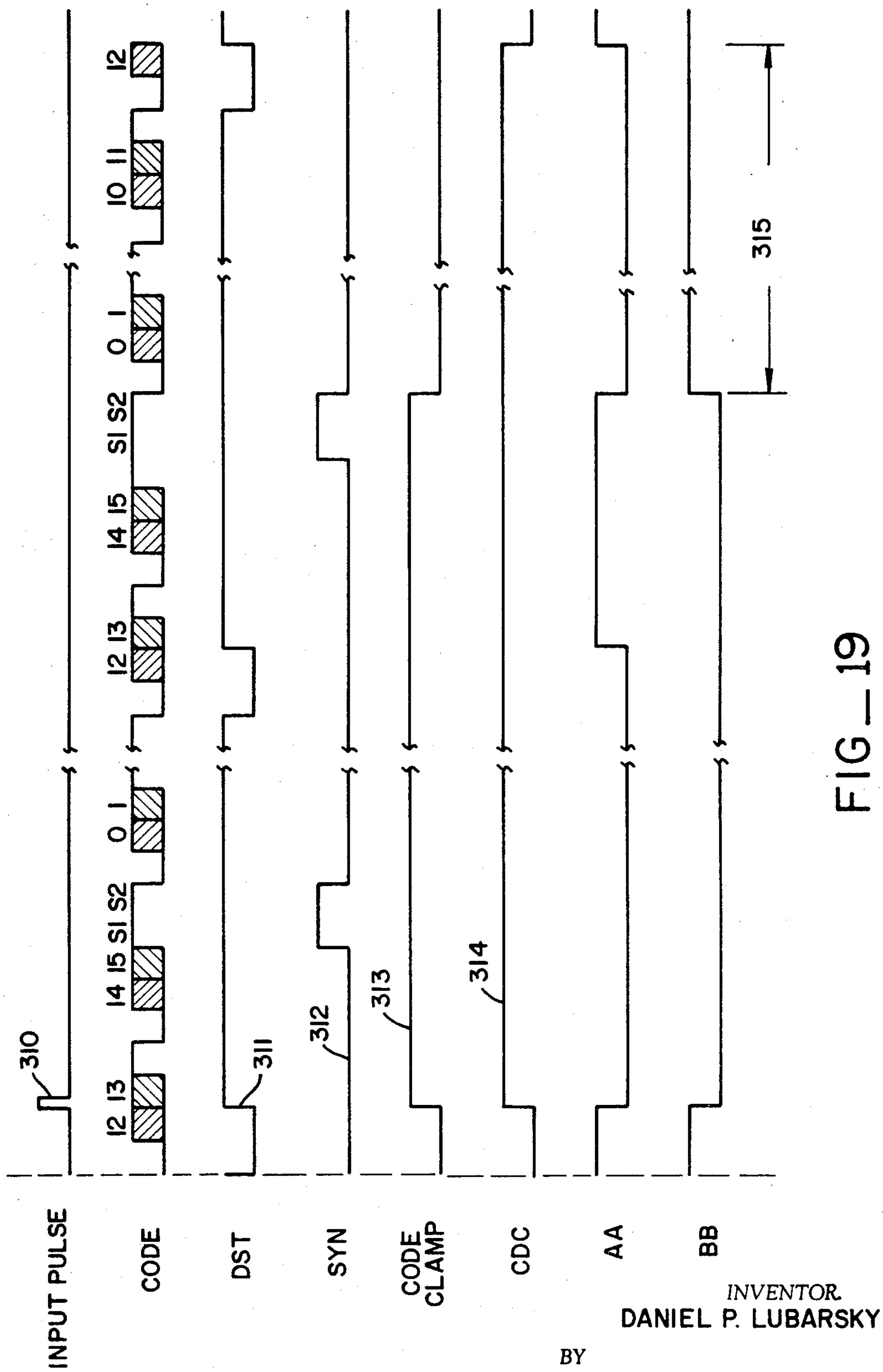

FIG. 19 is a timing flow chart for single word transmission.

Figure 20:
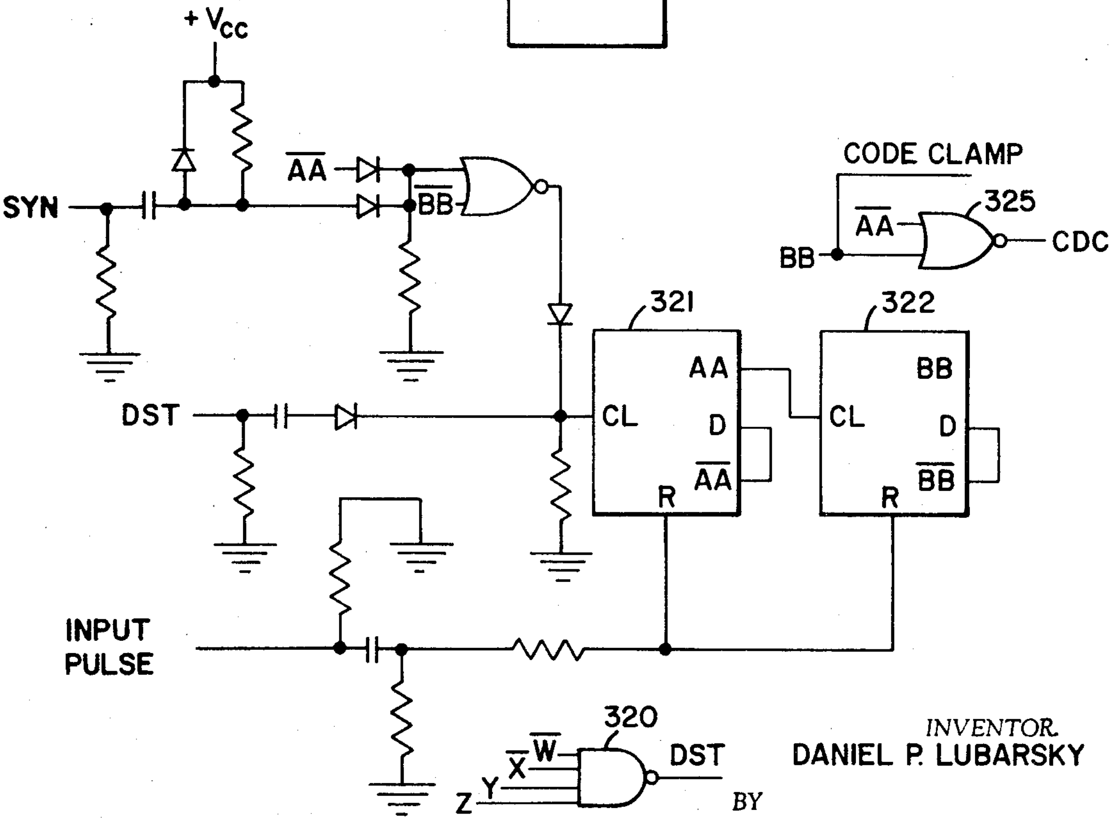

FIG. 20 is a schematic diagram of logic circuitry for use in single word transmission.

Figure 21:
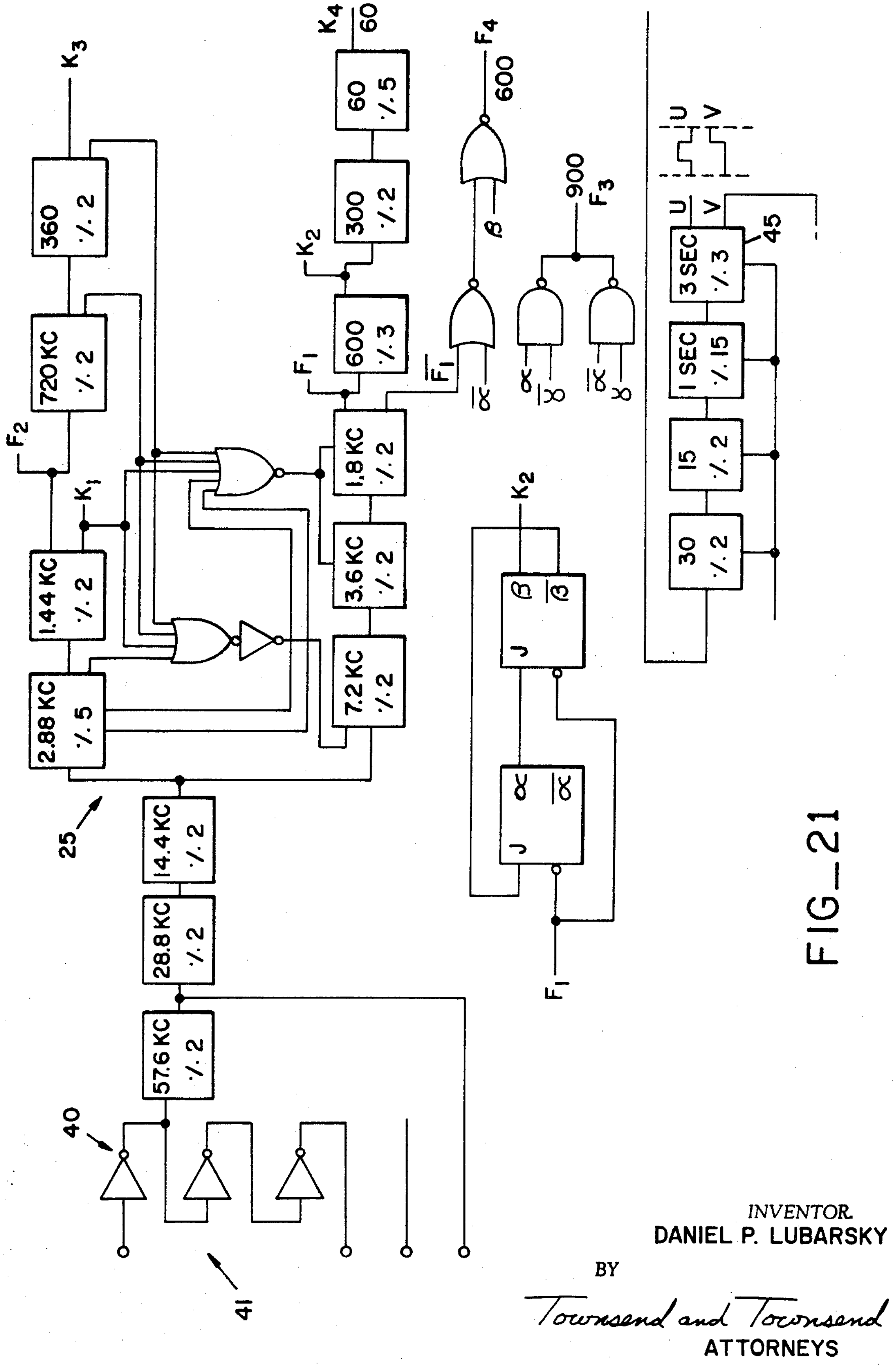

FIG. 21 is a schematic diagram of an alternate count down generator for phase coherent switching.

The binary code implemented by the encoder and decoder hereinafter described is generally set forth along the bottom line of the timing chart shown in FIG. 8. The binary code consists of a sequence of code elements each formed by four bits. The first bit of a code element is a timing bit having a first binary value of, for example, 0. The first timing bit is followed by two consecutive data bits whose values are determined by the data encoded. The two consecutive data bits are in turn followed by a second timing bit which forms the fourth timing bit of the code element. The second timing bit has a binary value opposite the first timing bit, namely, a value of one in the example hereinafter described. The code elements are in turn grouped into words and in the example hereinafter described eight code elements are formed into a word which terminates with either one or two synch bits having a one value. The termination of a code word is shown in the last line of the timing chart of FIG. 9 where the last code element of the word is shown followed by two synch or timing bits having a one value. A portion of the first code element of the following code word follows. Thus, one code word includes 16 data bits, 0–15, formatted within eight code elements as shown in Table I.

The encoder hereinafter described is also set forth in the context of a system which permits transmission from a plurality of encoders at remote stations along a common channel. A unique time window signal is generated at each remote station for actuating a transmission control once each predetermined period of time temporally non-coincident with the unique time window of any other station. In the example hereinafter set forth each time window is 3 seconds long and 64 different time windows are available for 64 different stations so that the unique time window for transmission from a particular station recurs every 192 seconds. The time window is divided into three 1-second intervals consisting of a transmit time interval of 1 second duration intermediate to wait time intervals of 1 second each. By this arrangement, a particular remote station can transmit during the unique time window of another station by offsetting the transmit time interval by one second to either end of the time window so that it is non-coincident with the transmit time interval of the unique time window of another station.

Figure 1:
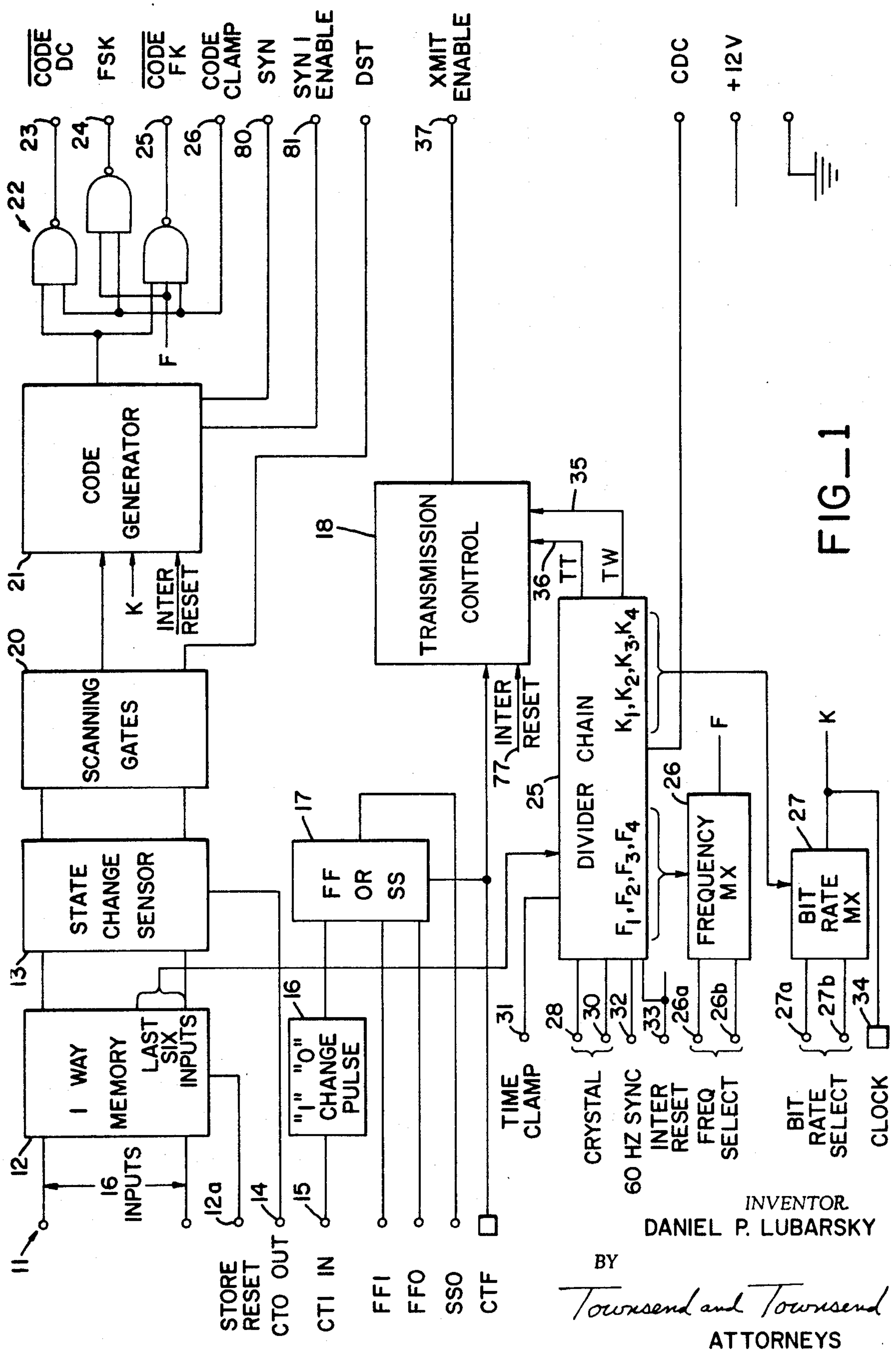
FIG. 1 is a block diagram of an encoder embodying the present invention.

Referring to the encoder set forth in the block diagram of FIG. 1, a plurality of sixteen data bits at the 16 input terminals 11 are stored in parallel in the one-way memory 12. Each of the parallel storage elements of

TABLE I

| Code element | #1 | | | | #2 | | | | #3 | | | | #4 | | | | #5 | | | | #6 | | | | #7 | | | | #8 | | | | | |
|---|---|---|---|---|---|---|---|---|---|---|---|---|---|---|---|---|---|---|---|---|---|---|---|---|---|---|---|---|---|---|---|---|---|---|
| Bit symbol | C | F0 | F1 | C | C | F2 | F3 | C | C | F4 | F5 | C | C | F6 | F7 | C | C | F8 | F9 | C | C | F10 | F11 | C | C | F12 | F13 | C | C | F14 | F15 | C | S1 | S2 |
| Binary value | 0 | X | X | 1 | 0 | X | X | 1 | 0 | X | X | 1 | 0 | X | X | 1 | 0 | X | X | 1 | 0 | X | X | 1 | 0 | X | X | 1 | 0 | X | X | 1 | 1 | 1 |

NOTE.—C denotes a clock or timing bit; F denotes a function or data bit; S1 denotes the end-of-word synch. bit; S2 denotes the frame synch. bit.

one-way memory 12 are monitored by a state change sensor 13 which provides a change trigger output signal CTO at terminal 14 whenever the state change sensor 13 senses a change in the state of memory 12. The CTO signal at terminal 14 is capacitatively coupled to input terminal 15 to provide a change trigger input signal CTI. The CTI signal is converted to a pulse by change pulse generator 16 which generates a pulse in response to a CTI signal whether the sensed change is from one to zero or zero to one in the memory 12. The generated pulse triggers the flip-flop or single shot vibrator 17 which in turn generates the filtered change trigger pulse CTF for partially enabling the transmission control 18. The flip-flop 17 functions as a noise filter to prohibit noise on the line from turning on the transmitter and can be monitored at terminal SSO. The CTO terminal 14 and CTI terminal 15 are coupled by an external capacitor. The time period of flip-flop 17 is adjusted by a capacitor across terminals FFI and FFO, whose capacitance is varied to adjust for noise time thresholds depending upon the environment in which the encoder is used.

The parallel input bits stored in memory 12 are sequentially scanned by scanning gates 20 which converts the parallel inputs to a serial string of data bits which is fed to the code generator 21 for encoding the data into code elements and arranging the code elements into code words. Memory 12 can be reset at terminal 12*a*.

The encoded output from code generator 21 is fed to the code selector gates 22 which permit code selection according to a variety of modes. At terminal 23 the code is in the form of a two level d.c. waveform having, for example, a zero voltage level for zero binary value and a 10 volt level for the binary one. At terminal 24 a frequency shift key code appears consisting of a two frequency waveform, one frequency corresponding to the zero binary value and the other frequency corresponding to binary one. At terminal 25 a frequency key code is available consisting of a d.c. voltage level for one binary value and a frequency signal for the other binary value. Terminal 26 permits clamping the code output.

The countdown chain or divider chain 25 generates the initial timing signals implemented in the encoder and also generates a plurality of frequencies F1 through F4 for frequency mixer or selector 26 which generates the frequency F used in the frequency code, depending on how the terminals 25*a* and 26*b* are clamped. The divider chain 25 also generates a plurality of bit rates K1 through K4 for use in the bit rates K1 through K4 for use in the bit rate mixer or selector 27 which generates the clock signal K used in forming the code, depending on how the terminals 27*a* and 27*b* are clamped. The inputs to the countdown chain 25 include a crystal oscillator at terminals 28 and 30 a time clamp at terminal 31 and a sixty hertz synch signal obtained from an A.C. line at terminal 32. Reset is afforded at terminal 33.

The output K from bit rate mixer or selector 27 provides an effective clock signal at terminal 34. The timing pulse train K is represented in the first line of the timing chart on FIG. 8 and on the first line of the timing chart of FIG. 9. The pulse train K has a period equal to the duration of a desired bit duration for the code elements and serves as a clocking signal for generating other timing and control signals as hereinafter described.

The countdown chain 25 also generates unique time window signals TW along line 35 and the transmit time interval TT within the time window along line 36 for actuating the transmission control unit 18 which in turn provides the transmit enable signal at terminal 37 for control of the transmitter. During the transmission disable time periods, the code generator is clamped at code clamp terminal 26.

Figure 3A:
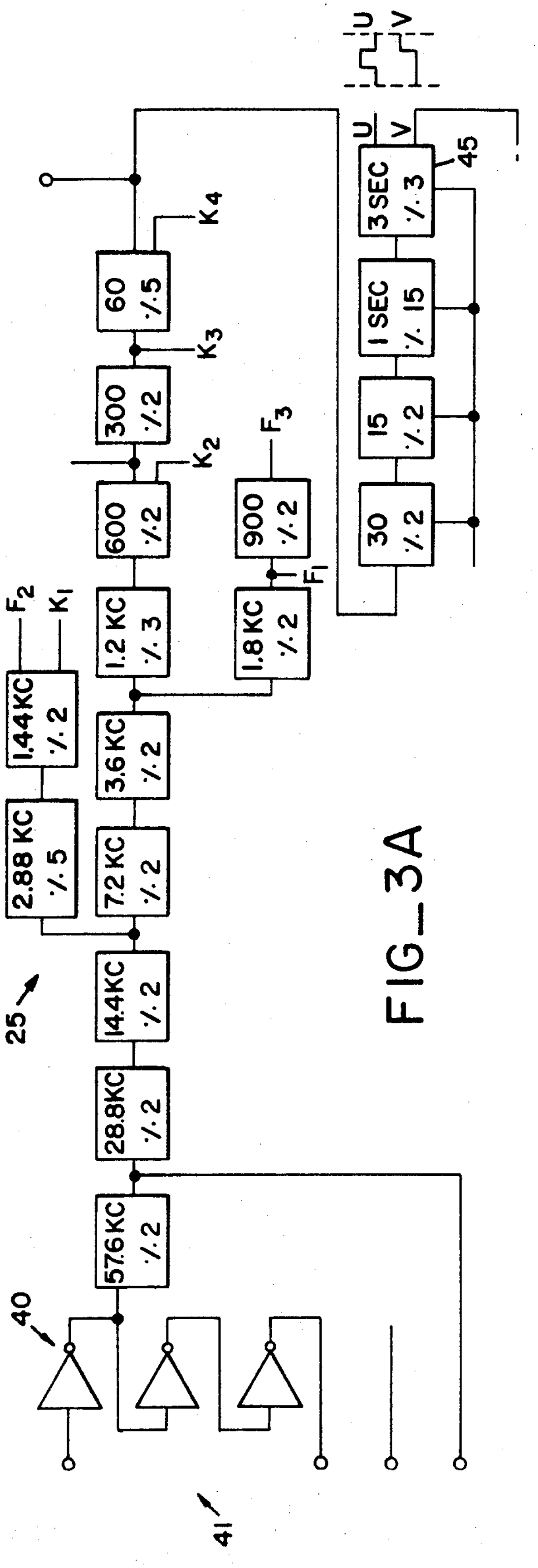
Figure 3C:
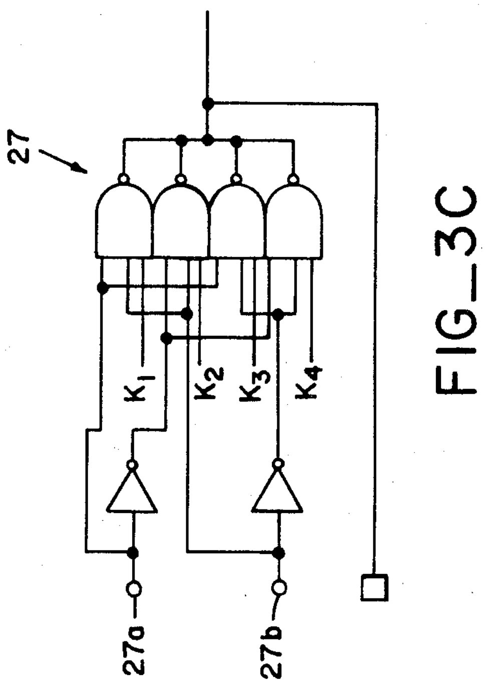
Figure 3B:
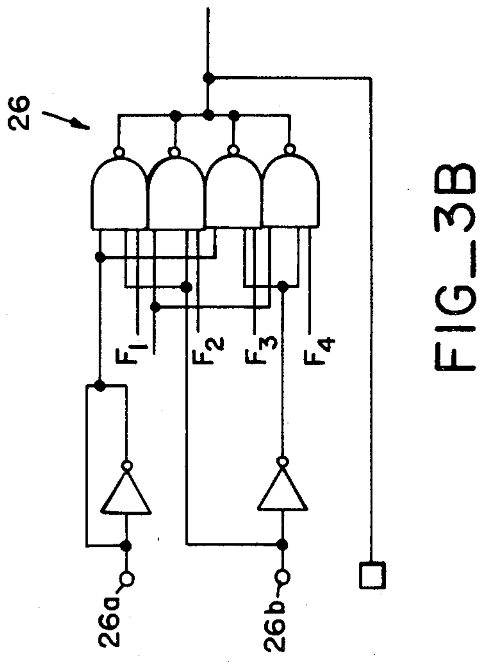

Referring to the divider chain shown in more detail in FIG. 3*a*, the divider chain includes an unstable oscillator 40 which is stabilized by feedback through a crystal 41. The crystal 41 provides oscillation at a frequency of, for example, 115.2 KC. The divider chain or countdown chain consists of a sequence of frequency dividers providing the frequencies and dividers indicated in the blocks. The frequencies $F_1$, $F_2$, $F_3$ and $F_4$ are tapped at the places indicated to provide the inputs to the frequency selector 26 which generates the desired frequency or tone F for use in the frequency shift key or frequency key mode of operation. The frequency mixer or selector gates are shown in FIG. 3b.

Similarly, the bit rates $K_1$, $K_2$, $K_3$, and $K_4$ are tapped from the divider chain 25 at the places shown to provide the inputs to the bit rate mixer or selector 27 to generate the desired clock signal K. The gates for bit rate selection are shown in FIG. 3*c*. In each of the logic diagrams, the standard symbols are used where the triangular symbol indicates logical inversion or an inverting amplifier. The logic gates which are flat on the left and convex on the right followed by a small circle represent NAND gates, while the logic gates that are concave on the left and convex on the right followed by a small circle represent NOR gates.

The latter part of the countdown chain 25 provides the timing signals for generating unique time window signal consisting of a three second interval once every 192 seconds. The outputs from frequency divider 45 are labeled the U and V signals. The U pulse signal consists of a 3 second interval having a first binary value during the first second, a second binary value during the second second, and a third binary value during the third second of the interval. Thus, the U signal is a three second signal having binary values of zero, one, and zero during the 3 seconds of the interval respectively. The V pulse signal consists of a 3 second interval having a first binary value for the first second, a first binary value for the second second, and a second binary value for the third second of the interval. Thus, the V signal has a binary value of zero, zero, and one, respectively, during the 3 seconds of the interval. As a result, the occurrence of the one value is offset to the end of the interval. The final portion of the countdown chain is shown in FIG. 3*d* and consists of a counter of six flip-flops providing output signals A, B, C, D, E and F at 6, 12, 24, 48, 96, and 192 second intervals. These timing signals A through F are gated through the parallel gates 47 with the outputs of the last six memory elements of memory 12 in which are temporarily stored the 16 parallel input data bits. The result of this gating is the unique time window signal TW which is a three second interval occurring once every 192 seconds for enabling the transmission control 18. The unique time window signal is itself comprised of 3 one-second intervals and the transmit time occurs for only 1 second during the middle of the interval and is referred to as the transmit time interval TT. A weight time interval occurs on either side of the transmit time interval.

Other timing signals implemented in the encoder are generated by the bit rate pulse train K and the counters shown in FIG. 5*a*. The flip-flop 50 generates from the pulse train K the two level waveform G of alternating binary values. The duration of each level in the waveform G is coincident with the desired bit duration of the code. The output from flip-flop 50 provides the input to flip-flop 51 which generates a two level waveform W having a period equal to the length of a code element, namely, four bits. As shown in the timing charts of FIGS. 8 and 9, the pulse train W has a period twice as long as pulse train G which in turn has a period twice as long as pulse train K. Cascaded flip-flops in the counter also generate X, Y, and Z timing signals and their complements for use as hereinafter described. Flip-flop 52 generates the single synch signal I shown on the timing chart at FIG. 8 indicating the end of word. A word consists of eight code elements and terminates in the single synch I or a double synch of two bits having a value "1" as hereinafter described. The remaining inputs and outputs of the counters in FIG. 5*a* are appropriately labeled.

Figure 5B:
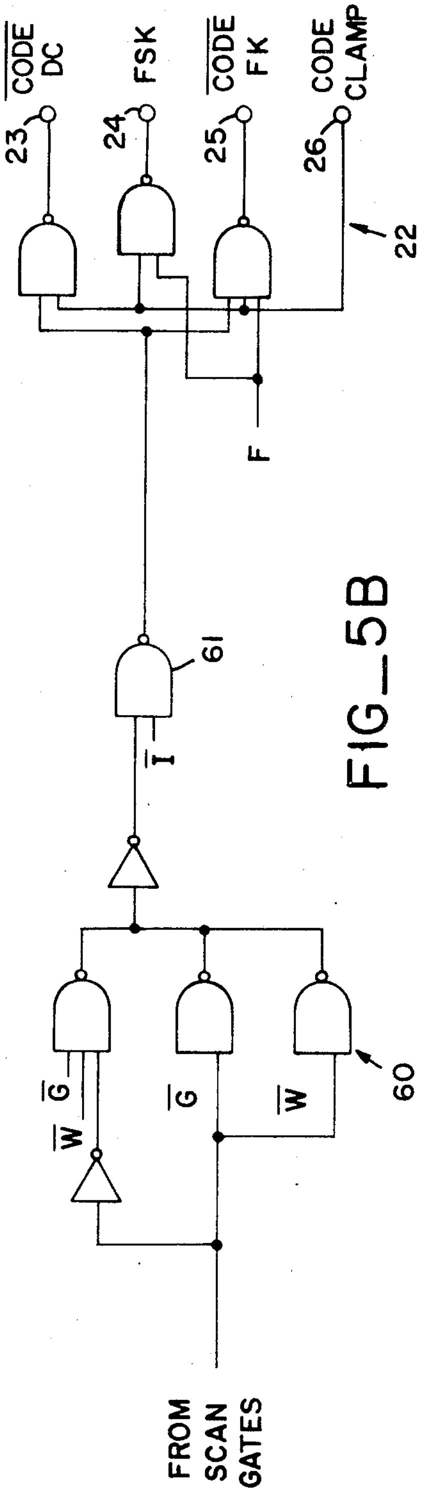

The input to the encoder is shown in more detail with reference to FIG. 2*a* where the 16 parallel input terminals 11 are connected in parallel to a series of 16 one-way memory elements 12, each comprising a multivibrator or flip-flop. The scanning gates 20 consist of a first row of parallel logic gates 55. The input data bits are gated with combinations of X, W, $\overline{X}$ and $\overline{W}$ timing signals generated from the counters of FIG. 5*a*. The outputs from the 16 gates 55 are in turn gated in groups of four through logical inversion elements to a row of 4 gates 56, the four inputs being gated with combinations of the timing signals Y, Z, $\overline{Y}$ and $\overline{Z}$ obtained from the counters shown in FIG. 5*a*. The final output on line 57 consists of a serial string of the 16 data bits in timed relationship for input to the code generator 21 which is shown in more detail in FIG. 5*b*.

The serial string of 16 data bits in timed relationship is fed to the logic gate 60 where it is gated with the timing pulses $\overline{G}$ and $\overline{W}$ derived from the counters of FIG. 5*a*. The output of gates 60 is in turn gated through logic element 61 with the inverted synch signal I to provide the code elements each consisting of four bits, the code elements arranged in groups of 8 comprising a word, each word terminating in at least one synch bit I. The code generator output is fed to the code selector gates 22 as heretofore described which permit selection of the code in either D.C. level waveform at terminals 23, a frequency shift key mode consisting of two different frequencies or tones representing the binary values at terminal 24, a frequency key mode at terminal 35 consisting of a D.C. level for one binary value and a frequency signal for the other, and a code clamp at terminal 26.

Particular examples of the code are set forth on lines 62, 63, 64 and 65 of the timing chart in FIG. 8. Line 62 represents an encoded sequence of data bits all having a binary value of one. As shown in the timing chart, each code element consisting of four bits begins with a zero bit followed by two binary one value data bits in turn followed by a one value timing bit. The entire word of eight code elements terminates in a single synch bit having a one binary value as shown at 66. Line 63 represents a sequence of encoded binary bits all having a value of zero. Each four bit code element begins with a zero value timing bit followed by two zero value data bits in turn followed by a one value timing bit. Line 64 represents a coded sequence of data bits of alternating one and zero values beginning with a one value. Thus, each code element includes a first data bit having a one value and a second data bit having a zero binary value. The two data bits are enclosed on each side with timing bits, the initial timing bit having a zero binary value and the final timing bit having a one binary value. Line 65 represents an encoded sequence of data bits of alternating binary value beginning with a zero value so that each code element includes two data bits, the first having a zero binary value and the second having a one binary value. The two data bits are in turn enclosed on each side by timing bits, the initial timing bit having a zero binary value and the final timing bit having a one binary value. Each of the lines 62 through 65 represents a code word of eight code elements terminating in the synch bit 66. The last line of the timing chart on FIG. 8 is a generalized representation of the code where the data bit positions are represented by cross-hatching and can take on either a zero binary value or a one binary value according to the encoded data.

FIG. 2*b* shows in more detail the state change sensor 13, change pulse generator 16, and single shot flip-flop 17 which functions as a noise filter. In FIG. 2b the state change sensor is formed by a series of 16 parallel connected resistors which sense the state of the 16 memories respectively of unit 12 providing an output whenever the state of a memory element changes. The change pulse generator 16 consists of two pulse generators 70 and 71 which produce the same output pulse for input to flip-flop 17 no matter what the direction of change detected in the memory elements. Thus, pulse generator 70 produces a pulse when a change to binary value one is sensed while pulse generator 71 generates a pulse when a change to binary value zero is sensed. When a change of state in a memory element is sensed and a pulse generated, flip-flop 17 is actuated to provide a change trigger signal CT through gate 72 for partially enabling the transmission control 18.

An alternative state change sensor is shown in FIG. 2*c* consisting of a series of 16 cascaded logic gate elements connected respectively to the 16 data bit input memories. Each element has an exclusive "OR" output. This sensor not only senses the input of a data word for encoding and transmission at the 16 parallel inputs but also generates a parity bit for the 16 data bit word which can be incorporated in the word and used for an error parity check at the receiving and decoding end as hereinafter described.

The transmission control unit 18 is set forth in more detail in FIG. 4. The transmitter control unit is partially enabled by a change trigger signal CT originating from the state change sensor as heretofore described and is specifically enabled by the time window signal TW generated by the divider chain 25. Other inputs to the logic gates of the transmitter control unit include the U signal and V signal derived from frequency divider 45 of the countdown chain. The U signal is a three second signal of three time intervals having binary values zero, one, zero, respectively, while the V signal is an offset signal of three seconds duration consisting of three one-second time intervals having binary values of zero, zero, one, respectively. Timing signals L, P, $\overline{L}$ and $\overline{P}$ are also gated with the input signals and are derived from j/k flip-flops 75 and 76 as shown in FIG. 4. Reset of the transmission control is afforded along line 77. The transmitter enabling signal is obtained at terminal 78.

The synch signal I derived from the counter flip-flop shown in FIG. *5a* and used in terminating encoded words also appears at terminal 80 of FIG. 1 while the synch enable terminal 81 permits choice of either one or double synch bits at the end of a word. Two synch signals of value 1 are shown in the line II of the time chart in FIG. 9. When a single synch bit is desired, the terminal 81 is clamped. Use of double synch bits is described hereinafter with reference to the decoder.

In operation of the encoder in the time window transmission mode, the transmission control allows transmission within one second of a sensor signal originating with the state change sensor 13 when the encoder is in its unique time window. In the worst case the delay is two seconds when the change sensor signal occurs during the unique time window of a remote station. In that event, transmission occurs in a non-unique time window in which the transmit time is offset from the center of the interval exemplified by the V signal derived from the frequency divider 45 of the countdown chain 25. Thus, the transmit time interval occurs offset whenever a memory element changes state during the time window of a remote station rather than during the unique time window of the home encoder. By this expedient, a delay in first transmission of a word is no more than 2 seconds and interference with the unique time window and transmit time interval of a remote station is avoided. A word initially transmitted in a non-unique offset time window is transmitted two more times. The second transmission occurs in the proper unique time window of the home encoder with the transmit time interval in the proper central position of the 3-second time window. The third transmission of the word occurs again in the unique real time window of the source station with the 1 second transmit time interval intermediate 1 second wait intervals. Thus, the longest delay before first transmission of a word after the state change sensor generates a signal is 2 seconds, while the second transmission occurs anywhere from 1 to 192 seconds after the first transmission depending upon the temporal distance from the unique time window of the source station. The third transmission occurs exactly 192 seconds after the second transmission where 192 seconds is the interval between unique time windows of a particular station. Thus, the station as described is adapted for multiplexing 64 remote stations on a common channel with 64 unique time windows each having a duration of 3 seconds.

A number of encoders can be stacked for continuous multiple word transmission. In stacking encoders, the synch signal at the end of the first work encoded by the first encoder is used to trigger the second encoder for processing the second word at a second plurality of inputs. The stacked encoders can then control a single transmitter. For continuous multiple word transmission by stacked encoders, the first word is provided with two synch bits at the end, while subsequent words terminate with a single synch bit. Double synch bits are provided at the end of the first word for use in enabling the first of stacked decoders at the receiving end as hereinafter described.

A stack of two encoders 160 and 161 is shown in FIG. 6 with the timing of the words and synch pulses at the output of the stack shown in FIG. *6a*. The stack of two encoders is provided in this example for encoding word pairs. As shown in FIG. *6a*, the first word terminates in double synch bits while the second word of each pair of words terminates in a single synch bit. The stacked encoders control a single transmitter and operate one at a time for sequential transmission. The input to the encoders from the countdown chain are sequentially controlled by flip-flop 162 having outputs Q and $\overline{Q}$ as shown.

In the example shown in FIG. 7 four stacked encoders are provided for transmission of four word groups. The timing of the output from the four stacked encoders is shown in the time line of FIG. *7a*. The first word in the group of four encoded words terminates in double synch bits while the second, third and fourth words of each four word sequence terminate in a single synch bit. The second synch bit at the end of the first word is used in enabling the first decoder in a stack of decoders at the receiving end as hereinafter described. Sequential operation of the four encoders 165, 166, 167 and 168 is controlled by the logic gates 170 through 173 and flip-flops 74 and 175. Flip-flops 174 and 175 provide the output signals M, $\overline{M}$, N and $\overline{N}$ used in sequentially gating the functioning of the four encoders sequentially to control a single transmitter.

The selected code formed at the encoder output is transmitted by a transmitter, not shown, on the common channel as a pulse code modulated signal. At the receiving end, the pulse code modulated signal is first applied to a demodulator, not shown, which produces a binary coded two level waveform for analysis by the decoder. By way of example, a zero voltage level is used to represent a binary zero and a nominal 10 volt level represents a binary one. A decoder for analysis of a received encoded word is shown generally in the block diagram of FIG. 10. As heretofore described, a single word produces a 33 or 34 bit word consisting of 16 data function bits, 16 clocking bits, and one or two synch bits at the end of the word. The data bits and timing bits are arranged in code elements of 4 bits, each beginning with a timing bit having a zero binary value followed by two data bits in turn followed by a second timing bit having a one binary value. In the case of a frame of multiple words encoded and transmitted from several synchronized stacked encoders at the transmitting station, only the first word, namely, the output word of the first encoder contains the second frame synchronization bit. The succeeding encoders generate 33 bit words with only a single word synchronization bit at the end of the word. In the 33 bit words, the last code element effectively includes 5 bits, the 4 standard code element bits and the single word synchronization bit. In the 34 bit word of a multiple word frame, the last code element is 6 bits in length including the standard 4 bits plus word synch and frame synch bits.

Proper timing within the decoder is accomplished by synchronizing a local oscillator 101 with the phaseof the incoming wave. The code waveform received at terminal 102 is differentiated by differentiator 103 and each negative going transition in the received PCM waveform is applied as a reset oscillator signal ROC to the oscillator to phase lock the oscillator signal to the bit rate of the incoming signal. At the same time a three stage ripple counter 105 counts the number of code elements of 4 bits each in each word.

The output pulses PLS from phase locked oscillator 101 are transformed by a byphase converter 106 into two trains of narrow timing pulses phase shifted 90° with respect to each other so that one of the trains of narrow timing pulses occurs at the leading edge of each bit position and the other train of pulses occurs at the mid-point of each bit position. The biphase signal is applied to a three stage shift register type counter 107 which counts the bit intervals of the code. The counter is reset on every negative going transition preceding a code element in the received signal and counts the number of bit intervals in each code element. The counters 105 and 107 in conjunction with other logic circuitry also generate a variety of timing signals and pulses for analysis of a received code word in the word analysis unit 110. The double scan (DS) option and the parity (PR) enable option both hereinafter described are implemented by gates 111 and 112, respectively. If word analysis indicates that the received code word is error free, the data fail detect flip-flop 115 and the select flip-flops 116 permit the values of the data bits in the code word received over line 118 to be sampled and strobed into the input storage memory unit 117. Terminals 120 and 121 labeled DSM permit the sampling and strobing signals to be clamped for double scanning of data words during multiple word transmission so that improper words are not received by the decoder during the double scan option as hereinafter described.

The parity fail enabling pin 123 operates to release an erroneous word from the word analysis unit with the error flagged in the event a parity check indicates an error. Terminal 124 is the transfer on synch 2 signal (TS2) for enabling word transfer when two synch bits are used. A transfer pulse STT is available at terminal 125 for setting the select flip-flop 116 to enable transfer of data from input storage memory 117 as hereinafter described. The input to the select flip-flop 116 is provided at terminal 126 and terminals STT and SLT are strapped when using a single decoder or on the first encoder of a multiple stack of decoders. On subsequent decoders of a stack of decoders SLT is set by the previous decoder. The 16 sampled data bits of a word stored in input storage memory 117 pass through a change detector and parity detector 130. A transfer gate 131 is enabled by the select flip-flop 116 on the synch pulse from word analysis unit 110 to permit transfer of error free data bits of a word to the output storage unit 132. At the same time, a data ready pulse DR is generated through a delay 133 to alert users that valid data is available at the decoder output driver 134 which is provided with 16 parallel output terminals corresponding to the 16 data bits of a code word.

The decoder input is shown in more detail in FIGS. 11, **11*a*, 11*b* and 11*c*. The code signal after demodulation passes to the differentiator 103 at terminal 102 which provides at its output a code signal CD, a code complement signal $\overline{CD}$, pulse generated at each negative going transition of the code designated $CT_t$ and its complement $\overline{CD}_t$. The signal $\overline{CD}_t$ provides the reset oscillator pulses ROS applied to terminal 104 for resetting the otherwise free running external oscillator 101 so that it is phase locked with the bit intervals of the code. A narrow train of output pulses PLS is provided by the oscillator at terminal 105, each pulse in the train being synchronized with the transitions of the received code. A sample segment of the code signal is shown in the first line of the timing chart on FIG. 16 labeled CD while the output of oscillator 101 is shown in the second line labeled PLS. The output pulse train PLS from the oscillator is converted into a biphase signal of 2 pulse trains $\phi_1$ and $\phi_2$ phase shifted with respect to each other by CL toggle counter 140. The two timing pulse trains $\phi_1$ and $\phi_2$ are shown on the correspondingly labeled lines of timing chart 16.** The pulses of narrow pulse train $\phi_1$ occur at the transitions between bits of the code while the narrow timing pulses $\phi_2$ occur substantially at the mid-point of the bit intervals of the code.

The two phase shifted pulse trains $\phi_1$ and $\phi_2$ are applied to the three stage shift register type counter 107 for counting bit intervals and generating appropriate timing pulses in conjunction with the logic circuitry of FIGS. **11*a* and 11*b*. Counter 107 is a two phase counter consisting of two phase flip-flops 141, 142 and 143 which count the bit intervals. The flip-flops of the counter generate timing signals A, B, and W, X, respectively set forth in the correspondingly labeled lines of time chart 16. As shown in the timing chart, the two level waveform A consists of alternating intervals of duration equal to the bit duration of the code but shifted to coincide with the transitions between bits of the codes while the two level waveform W has intervals of alternating binary value of duration equal to the code bit duration but coincident with the beginning and end of each code bit. As shown in FIG. 11*b*, the W, X, and Y pulse trains are appropriate gated through a series of logic gates 145 to provide a series of staggered pulses $L_1$ through $L_6$ respectively represented on the correspondingly labeled lines of the timing chart in FIG. 16. The pulses $L_1$ through $L_6$ are sequential pulses coincident with successive bit intervals of the code and in particular, $L_1$ through $L_6$ coincide with the 4** standard bits of a code element while $L_5$ and $L_6$ coincide with two synch bits $S_1$ and $S_2$ appearing at the end of a word.

Similarly, the pulse trains A, B, and C are appropriately gated through a sequence of gates 146 to produce a series of sequential pulses $P_{1\ through\ P7}$ represented in the correspondingly labeled lines of the timing chart in FIG. 17. The timing chart in FIG. 17 also presents the corresponding code bits and pulse trains $\phi_1$, $\phi_2$, A, B and C. Pulses $P_1$ through $P_7$ consist of time sequential pulses of duration equal to the bit interval duration of the code but phase shifted to be coincident with the transitions between bits of the code. In particular, $P_1$ through $P_3$ are coincident with the bit transitions within a four bit code element while $P_4$ is coincident with the transition between the last bit of a code element and a first synch bit appearing at the end of a word. The pulse $P_5$ is coincident with the transition between the two synch bits $S_1$ and $S_2$ when both appear at the end of a word. $P_6$ is coincident with the transition at the end of a second synch bit. $P_7$ is an illegal count of the A, B, C counter and occurs when there are too many pulses in a code element thereby indicating the occurrence of an error.

The time sequential pulses $L_1$ through $L_6$ because coincident with the bit intervals are utilized in word analysis for sensing bit values while the sequential timing pulses $P_1$ through $P_7$ being coincident with the transitions between bits of the code are used for sensing bit transitions. The bit sensing pulse on $L_1$ coincides with the binary zero clock bit initiating each code element, $L_2$ and $L_3$ coincide with the two consecutive data function bits, $L_4$ coincides with the second timing bit of each four bit code element and $L_5$ and $L_6$ coincide with synch bits $S_1$ and $S_2$ respectively in the eighth code element of a word which terminates in two synch bits. The pulse on line $P_1$ begins at the mid-point of each binary zero clock bit initiating a code element and ends at the mid-point of the first data function bit of a code element. The pulse on line $P_2$ is initiated at the mid-point of the first data function bit and terminates at the mid-point of the second data function bit while $P_3$ persists from the mid-point of the second function bit to the mid-point of the final clock bit of each four bit code element, the second timing bit having a binary one value. The pulse on line $P_4$ occurs from the mid-point of the second timing bit to the mid-point of the first synch bit $S_1$ in the eighth or last code element of a word, etc. After counting through pulse $P_6$, counter 107 normally resets but if through an error an illegal number of bits occurs in a code element and the counter 107 continues counting through a pulse on line $P_7$ an illegal extra count is detected as a result of the failure of the reset pulse at the end of the eighth code element. The occurrence of a pulse on line $P_7$ will signal the receipt of an illegal code element and cause rejection of the data word in the word analysis unit as hereinafter described.

In order to provide strobe pulses for sampling and examining the state of specified bits of the code, various of the pulses $L_1$ through $L_6$ are gated with pulse train $\phi_2$ which consist of narrow pulses occurring at the mid-points of bit intervals.

Such gates are used in the word analysis unit as described subsequently.

Also shown at FIG. 11 is the three stage ripple counter 105 used to count the number of code elements in each word. Each negative going transition of the received signal except during $P_2$ intervals causes the code element counter to advance one count. At the negative transition preceding the first timing bit at the beginning of the eighth code element of a code word, the code element counter produces an output pulse to partially enable the data transfer gate 131. The code element counter 105 is then reset at the mid-point of the first bit position of the first code element of the next word, the reset pulse provided by the $L_1 \cdot \phi_2$ pulse at gate 153. The pulse signals for controlling the counter 105 are derived from the gates shown in FIG. 11c including gates 147 and 148. The flip-flops of counter 105 generate time pulse signals D, E and F for subsequent use in the decoder, the wave forms D, E and F represented in the correspondingly labeled lines of timing chart 15.

The word analysis unit which forms the heart of the decoder is shown in FIG. 12. The code inputs to the word analysis unit include the code signal CD itself and the pulse train $CD_t$ generated by the differentiator which produces pulses on the negative going transitions of the code. Other inputs to the word analysis unit include the P pulse signals, the L pulse signals and the $\phi_2$ time pulses. Validation of each word takes place at a series of gates which provide parallel inputs at a common NOR gate 200. Each word undergoes a rigorous analysis bit-by-bit at the parallel gates which provide the inputs to NOR gate 200 so that a failure of any of the parallel validity checks will provide an output from gate 200 to set the two data failure flip-flops 201 and 202 having outputs FA–1 and FA–2, respectively. The data flip-flops 201 and 202 when set by a failure signal from gate 200, clamp the input to the select flip-flop 203 labeled SEL and this in turn prevents enabling of the data transfer gate 205 which controls transfer of data from input storage to output storage. The first data failure flip-flop 201 is reset by the synch bit S1 and the second data failure flip-flop 202 is reset by the combination of synch symbol S1 and the count signal FY corresponding to the eighth code element in a word indicating end of a word. These two inputs are available through gate 206.

The parallel inputs to gate 200 which perform the word analysis are as follows. Gates 210 and 211 check to insure the absence of any negative going transitions in the binary coded signal $CD_t$ during the P1 and P3 intervals, namely, during the transitions between the first timing bit and first data bit and between the second data bit and the second timing bit. Logic gates 212, 213 and flip-flop 214 validate that no more than one negative transition occurs during the P2 interval, namely, the interval between the two data bits of each code element. Gate 215 checks for a binary zero level during the first bit interval of each code element corresponding to the first timing bit. Gate 216 checks for a binary 1 value during the fourth bit interval of each code element corresponding to the second Line bit. Gate 217 provides a signal to gate 200 whenever an illegal number of bits is counted in a code element as indicated by the P7 pulse. Gate 218 checks for the proper state of the select flip-flop 203 at the time of data transfer at the end of a word indicated by the FY count. Gates 220 and 221 are used during the double scan option when the double scan procedure is enabled by appropriate signal on line $\overline{DS}$. As the data is twice strobed into the input storage no change must occur in the input storage registers, thus allowing two identical words to enter the register before transfer to the output storage. In the event a change in the state of the memory occurs, the change pulses on line 222 indicated by the symbol $X_0$ originating from the parity generator hereinafter described provide a signal to the error gate 200. A parity check signal is provided over line 225 from a parity check unit such as that illustrated, for example, in FIG. 13, which can be optionally provided.

The failure of any of these validity checks sets the two data flip-flops 201 and 202 as heretofore described and clamps the input to the select flip-flop 203. This prevents enabling of the data transfer gate 205 so that data cannot be transferred from the input storage unit to the output storage. The transfer pulse on line 226 is generated by detecting the end of the first word in a group of words by the code element counter as heretofore described. This transfer pulse is enabled at gate 227 by the "transfer on synch 2" signal TS2 on line 228. Terminal STT is connected to SLT to enable S2·FY to set the select flip-flop (SEL) allowing transfer of data to output storage if TS2 is set to enable transfer on synch 2. TS2 is disabled when it is grounded. The transfer pulse when enabled at gate 205, triggers the single shot 230 and delay circuit 231 performs the actual transfer of data from input storage to the output storage by means of output SS1. The transfer pulse is further delayed by a second delay circuit 232 labeled D2 to produce the data ready pulse DR indicating that the data has been transferred to the output storage and is ready for use. Data bit values are sampled at gates 235, 236, 237 and 238. The strobe pulses ST1 and ST2 shown in the timing chart of FIG. 15 are generated at the output of gate 240 from the timing pulses $\phi 2$. The strobe pulses are gated with the code signal CD and its complement $\overline{CD}$ and the broad timing pulse signals L2 and L3 which coincide with the two data pulses of each code element. The gated outputs from gates 235 through 238 shown in FIG. 12 are then strobed into the temporary input storage elements via enabling or strobing gates 245 as illustrated in the detailed logic diagram of FIG. 14. The strobing gates 246 and 247 for each of the 16 memory elements of the input storage are enabled by the output from gate 248 having the inputs shown in FIG. 14. The strobing data is temporarily stored in the cross-coupled input storage elements 250 of which there are 16. Following the input storage elements are the parity generator elements each formed by gates 252 and 253 which generate the output for use in the parity check unit shown in FIG. 13 and also for input to the double scan gates of the word analysis unit as heretofore described. When the data is indicated as error free the transfer gates 205 are enabled permitting transfer of the data bits to the output storage elements.

When the parity check option is utilized, the parity generator output $X_0$ is gated by means of gates 260 and 261 with the bits $Z_0$ and $Z_1$ which are two parity bits inserted at the beginning of each word when the parity option is used. The output of gates 260 and 261 is added with the output of OR gate 262 at gate 263. The inputs to OR gates 262 include the pulses $\overline{\phi 1}$, $\overline{P4}$, $\overline{FY}$ and FA–1 all heretofore identified. The final parity check signal PC provides an input to gate 200 over line 225 of the word analysis unit as heretofore described. A parity fail signal is available at terminal 265 for flagging erroneous data that it is desired to pass to the input storage unit. The parity pulse PR for checking parity is enabled via line 266.

Any number of decoders may be stacked to receive multiple words transmitted from stacked encoders at the transmitting end. When stacked multiple decoders are used the first received word ends in two synch bits and the second synch bit S2 is used to provide a transfer on synch 2 pulse TS2 at the enabling end of line 148 of the word analysis unit. The transfer of the first word to the output storage of the first decoder is thus enabled by the S2 pulse. In the following decoders of the stack, data is released on the S1 pulse. The data ready output signal DR of the first decoder enables the select flip-flops of the next decoder in line and the DR output of the next decoder enables the third decoder and so on.

Such a sequence of three stacked decoders is shown in FIG. 18 and the accompanying time graph of FIG. 18A. As shown in FIG. 18 the first decoder 300 receives the code and buffer stores the input for the subsequent decoders 301 and 302. In the first decoder 300 the terminals STT and SLT are strapped together and the data ready pulse from the first decoder enables the second decoder 301 on the SLT terminal. Similarly the data ready pulse of terminal DR on line 301 enables the third decoder 302 at the terminal SLT. As shown in the time line in FIG. 18A the second synch pulse S2 following the first word provides the enabling pulse for the next decoder while for the second and third words the first synch pulse S1 following the second and third words provides the enabling pulse for releasing data. Thus, in multiple word transmission the second synch pulse S2 enables the select flip-flop via line SLT for the first word and thereafter the first synch pulse S1 enables the select flip-flop.

The invention also provides an automated system for asynchronous single word transmission, the single transmitted word containing sufficient information content to be detected and properly decoded. Such a system is set forth in the timing chart of FIG. 19 and the circuitry of FIG. 20. According to this embodiment upon activation of an input pulse 310 to the encoder, the encoder unit begins transmitting when the input scanner of FIG. 2A indicates that data input bit 12 is being scanned as indicated by the DST signal 311 of the timing chart. Once the indication by the DST signal is provided that data input bit 12 has been scanned, the circuitry thereafter counts 2 SYN pulses indicated on line 312 of the timing chart, and starts transmitting at the end of the second SYN pulse. The SYN pulses coincide with the double synch pulses S1 and S2 at the end of each word so that the transmission occurs during the time period of the word fragment following the interrupted scan and the time period of the second full word scan at the inputs of FIG. 2A. Thus, the fragmentary portion of the end of the interrupted scan and the full word of the succeeding scan are transmitted. Each transmission of code is shut off at the end of the second SYN pulse which occurs at the end of the full word scan following the interruption at data bit 12, and transmission is clamped thereafter by the code clamp signal 313. The counter of FIG. 20 continues to advance to the 12th data bit input for rearming the system by producing another DST pulse which clamps the countdown generator. When another transmit command is actuated the encoder releases the CDC signal and again stops transmitting code after two SYN pulses. The CDC is thereafter again clamped when the scanner reaches data bit input 12. Thus, the time period in the flow chart of FIG. 19 indicated by numeral 315 is utilized for the purpose of rescanning the counter and scanner to the twelfth data bit input, rearming the system so that when the next transmit request comes the system begins at the twelfth data bit on the word it left off. It is thus seen that the system uses a fragmentary portion of the end of the last word for timing and synchronization in order to asynchronously transmit the next full single word. The system then resets itself after processing the transmitted word by again scanning the inputs up to data bit 12 and clamping the countdown chain CDC until next transmit command is actuated.

The derivation of the signals in the timing chart of FIG. 19 is shown in the logic circuitry of FIG. 20. The DST signal is derived from gate 320 having as inputs the *w*, *x*, *y* and *z* signals heretofore developed. The AA and BB signals are derived from flip-flops 321 and 322 respectively having as inputs the DST signal, the SYN pulses, and the initiating input pulse 310. The CDC signal is derived from gate 325 having as inputs signals derived from flip-flops 321 and 322 and the code clamp which clamps the CDC.

In an alternate embodiment, the counters and scanner are reset to the data bit 12 input immediately without recounting and rescanning the preceding inputs. This allows single words to be transmitted in more rapid succession but requires additional and more complicated electronic and logic circuitry.

In FIG. 21 there is shown an alternate countdown chain from that shown in FIG. 3A in order to provide phase coherent switching in the frequency shift key transmitting mode. In this alternate form, the flip-flops of the countdown generator or frequency divider chain are synchronized and additional timing signals are supplied for obtaining the zero crossing of the tone frequency. The frequencies and bit rates for this mode of frequency shift key transmission are chosen so that there are even multiples. In this alternate system the code phase is controlled and the two frequencies $F_1$ and $F_2$ of the FSK transmitting mode are made phase coherent not only with each other but also with the code. By this expedient phase coherent switching at the zero crossing of the tone frequency is possible. As shown in FIG. 21, because the divide by 3 counters are unsymmetrical additional gates are added to produce frequencies $F_3$ and $F_4$ which are symmetrical. All outputs are phase locked, and the derivation of the inputs to the gates is shown in FIG. 21.

I claim:

1. An automated method for encoding binary data comprising:

generating a first train of two level waveform timing pulses of alternating binary value, each alternating value having a duration equal to the desired code bit duration;

generating a second train of two level waveform timing pulses of alternating binary value, said second train having a period equal to one desired element comprising four code bits;

scanning binary data bits at a plurality of parallel data inputs and serially converting the data into a string of data bits;

and logically gating the first and second trains of timing pulses and the data bit string to form a sequence of code elements, each code element comprising four bits beginning with a timing bit having a first binary value followed by two consecutive data bits in turn followed by a second timing bit having a second binary value.

2. An encoder for encoding binary data comprising:

means for generating a first train of two level waveform timing pulses of alternating binary value, each alternating valve having a duration equal to the desired code bit duration;

means for generating a second train of two level waveform timing pulses of alternating binary value, said second train having a period equal to one desired code element comprising four code bits;

means for scanning binary data bits at a plurality of parallel data inputs and serially converting the data into a string of data bits;

and logic circuit means for gating the first and second trains of timing pulses and the data bit string to form a sequence of code elements, each code element comprising four bits beginning with a timing bit having a first binary value followed by two consecutive data bits in turn followed by a second timing bit having a second binary value.

* * * * *